United States Patent
Kanekiyo et al.

(10) Patent No.: US 7,261,781 B2
(45) Date of Patent: *Aug. 28, 2007

(54) NANOCOMPOSITE MAGNET

(75) Inventors: Hirokazu Kanekiyo, Kyoto (JP); Toshio Miyoshi, Osaka (JP); Satoshi Hirosawa, Otsu (JP)

(73) Assignee: Neomax Co., Ltd., Osaka (JP)

( * ) Notice: Subject to any disclaimer, the term of this patent is extended or adjusted under 35 U.S.C. 154(b) by 188 days.

This patent is subject to a terminal disclaimer.

(21) Appl. No.: 10/432,862

(22) PCT Filed: Nov. 19, 2002

(86) PCT No.: PCT/JP02/12089

§ 371 (c)(1),
(2), (4) Date: May 28, 2003

(87) PCT Pub. No.: WO03/044812

PCT Pub. Date: May 30, 2003

(65) Prior Publication Data

US 2004/0051614 A1     Mar. 18, 2004

(30) Foreign Application Priority Data

Nov. 22, 2001 (JP) .............................. 2001-358377
Nov. 22, 2001 (JP) .............................. 2001-358378

(51) Int. Cl.
*H01F 1/057* (2006.01)
*H01F 1/058* (2006.01)

(52) U.S. Cl. ...................................... 148/302; 148/301

(58) Field of Classification Search ................ 148/301, 148/302, 303; 420/83, 121; 75/244
See application file for complete search history.

(56) References Cited

U.S. PATENT DOCUMENTS 4,585,473 A    4/1986  Narasimhan et al.

(Continued)

FOREIGN PATENT DOCUMENTS

DE    197 39 959 A1    3/1998

(Continued)

OTHER PUBLICATIONS

Coehoorn et al., "Novel Permanent Magnetic Materials Made by Rapid Quenching" Journal de Physique, Colloque C8, Supplément au No. 12, Tome 49, Dec. 1988, pp. 669-670.

(Continued)

*Primary Examiner*—John P. Sheehan
(74) *Attorney, Agent, or Firm*—Keating & Bennett, LLP

(57) ABSTRACT

A nanocomposite magnet has a composition represented by $(Fe_{1-m}T_m)_{100-x-y-z-n}Q_xR_yTi_zM_n$, where T is at least one of Co and Ni, Q is at least one of B and C, R is at least one rare earth element that always includes at least one of Nd and Pr and optionally includes Dy and/or Tb, and M is at least one element selected from the group consisting of Al, Si, V, Cr, Mn, Cu, Zn, Ga, Zr, Nb, Mo, Ag, Hf, Ta, W, Pt, Au and Pb. The mole fractions x, y, z, m and n satisfy 10 at %<x≦20 at %, 6 at %≦y<10 at %, 0.5 at %≦z≦12 at %, 0≦m≦0.5 and 0 at %≦n≦10 at %, respectively. The nanocomposite magnet has an oxygen content of at most about 1,500 ppm by mass.

4 Claims, 6 Drawing Sheets

U.S. PATENT DOCUMENTS

| | | | |
|---|---|---|---|
| 4,597,938 A | 7/1986 | Matsuura et al. | |
| 4,664,724 A | 5/1987 | Mizoguchi et al. | |
| 4,770,723 A | 9/1988 | Sagawa et al. | |
| 4,802,931 A | 2/1989 | Croat | |
| 4,836,868 A | 6/1989 | Yajima et al. | |
| 4,845,837 A | 7/1989 | Lloyd | |
| 4,851,058 A | 7/1989 | Croat | |
| 4,935,074 A | 6/1990 | De Mooij et al. | |
| 4,994,109 A | 2/1991 | Willman et al. | |
| 5,022,939 A | 6/1991 | Yajima et al. | |
| 5,049,203 A | 9/1991 | Mukai et al. | |
| 5,049,208 A | 9/1991 | Yajima et al. | |
| 5,190,684 A | 3/1993 | Yamashita et al. | |
| 5,209,789 A | 5/1993 | Yoneyama et al. | |
| 5,225,004 A | 7/1993 | O'Handley et al. | |
| 5,230,749 A | 7/1993 | Fujimura et al. | |
| 5,240,513 A | 8/1993 | McCallum et al. | |
| 5,595,608 A | 1/1997 | Takebuchi et al. | |
| 5,597,425 A | 1/1997 | Akioka et al. | |
| 5,665,177 A | 9/1997 | Fukuno et al. | |
| 5,666,635 A | 9/1997 | Kaneko et al. | |
| 5,725,792 A | 3/1998 | Panchanathan | |
| 5,834,663 A | 11/1998 | Fukuno et al. | |
| 5,858,123 A | 1/1999 | Uchida et al. | |
| 5,872,501 A | 2/1999 | Hamano et al. | |
| 5,905,424 A | 5/1999 | Panchanathan | |
| 6,022,424 A | 2/2000 | Sellers et al. | |
| 6,172,589 B1 | 1/2001 | Fujita et al. | |
| 6,183,571 B1 | 2/2001 | Inoue et al. | |
| 6,183,572 B1 | 2/2001 | Panchanathan et al. | |
| 6,280,536 B1 | 8/2001 | Inoue et al. | |
| 6,302,972 B1 * | 10/2001 | Hirosawa et al. | 148/302 |
| 6,332,933 B1 | 12/2001 | Ma et al. | |
| 6,352,599 B1 | 3/2002 | Chang et al. | |
| 6,386,269 B1 * | 5/2002 | Kanekiyo et al. | 164/463 |
| 6,471,786 B1 * | 10/2002 | Shigemoto et al. | 148/105 |
| 6,478,889 B2 * | 11/2002 | Kanekiyo | 148/302 |
| 6,648,984 B2 | 11/2003 | Takaki et al. | |
| 6,706,124 B2 * | 3/2004 | Kanekiyo et al. | 148/302 |
| 6,790,296 B2 | 9/2004 | Kanekiyo et al. | |
| 6,796,363 B2 * | 9/2004 | Arai et al. | 164/443 |
| 6,814,776 B2 | 11/2004 | Kanekiyo et al. | |
| 6,890,392 B2 * | 5/2005 | Kanekiyo et al. | 148/101 |
| 2001/0015239 A1 * | 8/2001 | Kanekiyo | 148/104 |
| 2002/0017339 A1 | 2/2002 | Kanekiyo et al. | |
| 2002/0117235 A1 | 8/2002 | Kanekiyo et al. | |
| 2003/0136468 A1 * | 7/2003 | Kanekiyo et al. | 148/101 |
| 2004/0051614 A1 | 3/2004 | Kanekiyo et al. | |
| 2004/0099346 A1 | 5/2004 | Nishiuchi et al. | |
| 2004/0134567 A1 | 7/2004 | Kanekiyo et al. | |
| 2004/0194856 A1 | 10/2004 | Miyoshi et al. | |
| 2005/0040923 A1 | 2/2005 | Miyoshi | |

FOREIGN PATENT DOCUMENTS

| | | |
|---|---|---|
| EP | 0 197 712 | 3/1986 |
| EP | 0 197 712 * | 10/1986 |
| EP | 0 302 395 | 2/1989 |
| EP | 0 529 148 A2 | 3/1993 |
| EP | 0 632 471 A2 | 1/1995 |
| EP | 0 874 375 A1 | 10/1998 |
| EP | 0 959 478 | 11/1999 |
| EP | 1 018 751 A1 | 7/2000 |
| EP | 1 061 532 A1 | 12/2000 |
| EP | 1 158 545 | 11/2001 |
| EP | 1 207 537 | 5/2002 |
| EP | 1 371 434 A1 | 12/2003 |
| HU | 199904 B | 1/1989 |
| JP | 59-046008 | 3/1984 |
| JP | 60-009852 | 1/1985 |
| JP | 61-140350 | 6/1986 |
| JP | 62-062503 | 3/1987 |
| JP | 63-155601 | 6/1988 |
| JP | 63-190138 | 8/1988 |
| JP | 63-301505 | 12/1988 |
| JP | 64-000703 | 1/1989 |
| JP | 64-007501 | 1/1989 |
| JP | 64-007502 | 1/1989 |
| JP | 64-081301 | 3/1989 |
| JP | 01-100242 | 4/1989 |
| JP | 01-162702 | 6/1989 |
| JP | 01-204401 | 8/1989 |
| JP | 02-247307 | 10/1990 |
| JP | 02-298003 | 12/1990 |
| JP | 2-298003 | 12/1990 |
| JP | 3-260018 | 11/1991 |
| JP | 3-261104 A | 11/1991 |
| JP | 03-264653 | 11/1991 |
| JP | 04-147604 | 5/1992 |
| JP | 05-269549 | 10/1993 |
| JP | 05-315174 | 11/1993 |
| JP | 06-32471 | 2/1994 |
| JP | 06-140235 | 5/1994 |
| JP | 06-338407 | 12/1994 |
| JP | 7-122412 A | 5/1995 |
| JP | 07-226312 | 8/1995 |
| JP | 08-053710 | 2/1996 |
| JP | 08-124730 | 5/1996 |
| JP | 8-162312 | 6/1996 |
| JP | 08-162312 | 6/1996 |
| JP | 08-167515 | 6/1996 |
| JP | 08-322175 | 12/1996 |
| JP | 09-155507 | 6/1997 |
| JP | 09-155513 | 6/1997 |
| JP | 09-260122 | 10/1997 |
| JP | 10-53844 | 2/1998 |
| JP | 10-088294 A | 4/1998 |
| JP | 10-261515 | 9/1998 |
| JP | 10-280010 | 10/1998 |
| JP | 10-282790 | 10/1998 |
| JP | 11-8109 | 1/1999 |
| JP | 11-071646 | 3/1999 |
| JP | 11-101607 | 4/1999 |
| JP | 11-206075 | 7/1999 |
| JP | 11-323509 | 11/1999 |
| JP | 2000-079449 | 3/2000 |
| JP | 2000-079451 | 3/2000 |
| JP | 2000-234137 | 8/2000 |
| JP | 2000-235909 | 8/2000 |
| JP | 2000-348919 | 12/2000 |
| JP | 2001-244107 | 9/2001 |
| JP | 2002-64009 * | 2/2002 |
| JP | 2002-80921 | 3/2002 |
| JP | 2002-175908 | 6/2002 |
| JP | 2002-212686 * | 7/2002 |
| JP | 2002-234137 | 8/2002 |
| JP | 2002-239688 * | 8/2002 |
| JP | 2002-302702 | 10/2002 |
| KR | 100201601 | 3/1999 |
| RU | 2 136 069 | 9/1999 |
| WO | WO99/21196 | 4/1999 |
| WO | WO 00/03403 | 1/2000 |
| WO | WO 00/52715 | 2/2000 |
| WO | WO 00/45397 | 8/2000 |
| WO | WO 00/52713 | 9/2000 |
| WO | WO 01/68297 | 9/2001 |
| WO | 2002-64009 | 2/2002 |
| WO | WO 02/067275 | 8/2002 |

| | | | |
|---|---|---|---|
| WO | WO 02/093591 | 11/2002 | |

OTHER PUBLICATIONS

Chang et al., "The Effects of Refractory Metals on the Magnetic Properties of Properties of $\alpha$-Fe/$R_2Fe_{14}$B-Type Nanocomposites" IEEE Transactions on Magnetics, vol. 35, No. 5 Sep. 1999, pp. 3265-3267.

Yao, J.M. et al, "Coercivity of Ti-modified ($\alpha$-Fe)-$Nd_2Fe_{14}$B Nanocrystalline Alloys", Journal of Applied Physics, Nov. 15, 1994, pp. 7071-7073, vol. 76, No. 10, American Institute of Physics, Woodbury, New York, USA.

Chang et al., "High Performance $\alpha$-Fe/$Nd_2Fe_{14}$B-type Nanocomposites", pp. 121-123, Jan. 1998, Applied Physics Letters, vol. 72, No. 1.

Chiriac, et al., "$Nd_8Fe_{73}Co_5Hf_2B_{12}$ strip cast alloy", Journal of Applied Physics, vol. 87 No. 9, May 2000, pp. 5338-5340.

Lewis L H et al; "Compositional Clustering in ND2FE14B Melt-Spun Ribbons" Journal of Applied Physics, American Institute of Physics. New York, US, vol. 87, No. 9, May 1, 2000, pp. 4735-4737.

Chang et al., "Magnetic and Microstructure Studies of Boron-Enriched($Nd_{0.95}La_{0.05}$)$_{11}$$Fe_{76.5-x}Co_xTi_2B_{10.5}$(x=0-15) Melt-Spun Ribbons", pp. 3312-3314, Sep. 2000, IEEE Transactions on Magnetics, vol. 36, No. 5.

Chang et al., "The Effect of La-Substitution on the Microstructure and Magnetic Properties of Nanocomposite NdFeB Melt Spun Ribbons", pp. 65-70, Mar. 1997, Journal of Magnetism and Magnetic Materials, vol. 167, Nos. 1-2.

Chang et al., "High Performance $\alpha$-Fe/$R_2Fe_{14}$B-Type Nanocomposites with Nominal Compositions of $(Nd,La)_{9.5}Fe_{78-x}Co_xCr_2B_{10.5}$", Journal of Magnetism and Magnetic Materials, vol. 189, No. 1, (1998), pp. 55-61.

Chang, et al., "The effect of boron and rare earth contents on the magnetic properties of La and Cr substituted $\alpha$-Fe/$R_2Fe_{14}$B-Type Nanocomposites", Journal of Applied Physics, vol. 83 No. 11, Jun. 1998 pp. 6271-6273.

D.J. Branagan, et al., "A New Generation of Gas Atomized Powder with Improved Levels of Energy Product and Processability", IEEE Transactions of Magnetics, vol. 32, No. 5, Sep. 1996, pp. 5097-5099.

Hermann et al., "Growth Kinetics in Undercooled Nd-Fe-B Alloys with Carbon and Ti or Mo Additions" pp. 82-86, Apr. 2000, Journal of Magnetism and Magnetic Materials, vol. 213, Nos. 1-2.

J. Bernardi, et al., "Microstructural analysis of strip cast Nd-Fe-B alloys for high (BH)$_{max}$ magnets", Journal of Applied Physics, vol. 83 No. 11, Jun. 1998, pp. 6396-6398.

L. Henderson Lewis et al., "Phase Composition and Magnetic Characteristics of Inert Gas-Atomized RE-Fe-B-Based Powders", IEEE Transactions on Magnetics, vol. 31, No. 6, Nov. 1995, pp. 3641-3643.

M.J. Kramer et al., " A Generalized Solidification Model and Microstructural Verification for the Nd-Fe-B-Ti-C System Processed by Rapid Solidification", J. App. Phys. 81(8), Apr. 1997. pp. 4459-4461.

Merkulova et al., "The Temperature Dependence of Coercivity in Nancrystallyne Nd-Fe-B-(TiC) Magnets", Journal of Applied Physics, vol. 87, No. 9, (2000), pp. 4738-4740.

Missell et al., "Rare-Earth Magnets and Their Applications," Proceedings of the 14th International Workshop, Sep. 1996, pp. 28-37, vol. 1, World Scientific, Singapore, new Jersey, London, Hong Kong.

Q. Chen, et al., "A Study on the Phase Transformation and Exchange-coupling of $(Nd_{0.95}La_{0.05})_{9.5}Fe_{bal}C_{05}Nb2B_{10-5}$ Nanaocomposites, Materials Research Society Symposium Proceedings", Vo.577, Apr. 1999,pp.209-219.

Z.S. Wronski, "Microstructure and Magnetic Properties of Low-Neodymium Nd-Fe-B-Si Magnets Produced from HP Gas Atomized Powder", J. Appl. Phys. 69(8), Apr. 1991, pp. 5507-5509.

Fumitoshi Yamashita, "Applications of Rare-Earth Magnets to the Small Motor Industry", Proceedings of the Seventeenth International Workshop, Aug. 18-22, 2002, Newark, Delaware, USA, pp. 100-111.

U.S. Appl. No. 10/381,005. filed Mar. 20, 2003. "Iron-based rare earth alloy nanocomposite magnet and method for producing the same."

U.S. Appl. No. 10/484,072, filed Jan. 16, 2004. "Method for producing nanocomposite magnet using atomizing method."

U.S. Appl. No. 10/642,324, filed Aug. 18, 2003. "Compound for rare-earth bonded magnet and bonded magnet using the compound."

U.S. Appl. No. 10/745,834, filed Dec. 24, 2003. "Permanent magnet including multiple ferromagnetic phases and method for producing the magnet."

Office Action issued Mar. 28, 2005. U.S. Appl. No. 10/381,005. "Iron-based rare earth alloy nanocomposite magnet and method for producing the same."

U.S. Appl. No. 09/455,469, filed Dec. 6, 1999. "Nanocomposite magnetic material and method for producing nanocomposite magnetic material."

Official Communication based issued in the corresponding Japanese Patent Application No. 2002-331867; Mailing Date: Aug. 23, 2005 (With full English translation).

Hungarian Search Report filed in Hungarian Patent Application No. P0400631, dated Apr. 7, 2004.

* cited by examiner

NANOCOMPOSITE MAGNET

BACKGROUND OF THE INVENTION

1. Field of the Invention

The present invention generally relates to a permanent magnet that is applicable for use in, for example, motors and actuators of various types, and more particularly, the present invention relates to a nanocomposite magnet.

2. Description of the Related Art

Recently, it has become more and more necessary to further improve the performance of, and further reduce the size and weight of, consumer electronic appliances, office automation appliances and various other types of electric equipment. For these purposes, a permanent magnet for use in each of these appliances is required to maximize its performance to weight ratio when operated as a magnetic circuit. For example, a permanent magnet with a remanence $B_r$ of at least about 0.5 T is now in high demand. Hard ferrite magnets have been used widely because magnets of this type are relatively inexpensive. However, the hard ferrite magnets cannot achieve the high remanence $B_r$ of at least about 0.5 T.

An Sm—Co based magnet, produced by a powder metallurgical process, is currently known as a typical permanent magnet that achieves the high remanence $B_r$ of at least about 0.5 T. However, the Sm—Co based magnet is expensive, because Sm and Co are both expensive materials.

As for the Nd—Fe—B based magnet on the other hand, the magnet is mainly composed of relatively inexpensive Fe (typically in an amount of about 60 wt % to about 70 wt % of the total weight), and is much less expensive than the Sm—Co based magnet. Examples of other high-remanence magnets include an Nd—Fe—B based sintered magnet produced by a powder metallurgical process and an Nd—Fe—B based rapidly solidified magnet produced by a melt quenching process. An Nd—Fe—B based sintered magnet is disclosed in Japanese Laid-Open Publication No. 59-46008, for example, and an Nd—Fe—B based rapidly solidified magnet is disclosed in Japanese Laid-Open Publication No. 60-9852, for instance. Nevertheless, it is still expensive to produce the Nd—Fe—B based magnet. This is partly because huge equipment and a great number of manufacturing and processing steps are required to separate and purify, or to obtain by reduction reaction, Nd, which usually accounts for about 10 at % to about 15 at % of the magnet. Also, a powder metallurgical process normally requires a relatively large number of manufacturing and processing steps by its nature.

Compared to an Nd—Fe—B based sintered magnet formed by a powder metallurgical process, an Nd—Fe—B based rapidly solidified magnet can be produced at a lower cost by a melt quenching process. This is because an Nd—Fe—B based rapidly solidified magnet can be produced through relatively simple process steps of melting, melt quenching and heat treating. However, to obtain a permanent magnet in bulk by a melt quenching process, a bonded magnet should be formed by compounding a magnet powder, made from a rapidly solidified alloy, with a resin binder. Accordingly, the magnet powder normally accounts for at most about 80 volume % of the molded bonded magnet. Also, a rapidly solidified alloy, formed by a melt quenching process, is magnetically isotropic.

For these reasons, an Nd—Fe—B based rapidly solidified magnet produced by a melt quenching process has a remanence $B_r$ lower than that of a magnetically anisotropic Nd—Fe—B based sintered magnet produced by a powder metallurgical process.

As disclosed in Japanese Laid-Open Publication No. 1-7502, a technique of adding, in combination, at least one element selected from the group consisting of Zr, Nb, Mo, Hf, Ta and W and at least one more element selected from the group consisting of Ti, V and Cr to the material alloy effectively improves the magnetic properties of an Nd—Fe—B based rapidly solidified magnet. When these elements are added to the material alloy, the magnet has increased coercivity $H_{cJ}$ and anticorrosiveness. However, the only known effective method of improving the remanence $B_r$ is increasing the density of the bonded magnet. Also, where an Nd—Fe—B based rapidly solidified magnet includes a rare earth element at about 6 at % or more, a melt spinning process, in which a melt of its material alloy is ejected through a nozzle against a chill roller, has often been used in the prior art to rapidly cool and solidify the material alloy at an increased rate.

As for an Nd—Fe—B based rapidly solidified magnet, an alternative magnet material was proposed by R. Coehoorn et al., in J. de Phys, C8, 1998, pp. 669-670. The Coehoorn material has a composition including a rare earth element at a relatively low mole fraction (i.e., around $Nd_{3.8}Fe_{77.2}B_{19}$, where the subscripts are indicated in atomic percentages) and an $Fe_3B$ phase as its main phase. This permanent magnet material is obtained by heating and crystallizing an amorphous alloy that has been prepared by a melt quenching process. Also, the crystallized material has a metastable structure in which a soft magnetic $Fe_3B$ phase and a hard magnetic $Nd_2Fe_{14}B$ phase coexist and in which crystal grains of very small sizes (i.e., on the order of several nanometers) are distributed finely and uniformly as a composite of these two crystalline phases. For that reason, a magnet made from such a material is called a "nanocomposite magnet". It was reported that such a nanocomposite magnet has a remanence $B_r$ as high as about 1 T or more. But the coercivity $H_{cJ}$ thereof is relatively low, i.e., in the range of about 160 kA/m to about 240 kA/m. Accordingly, this permanent magnet material is applicable only when the operating point of the magnet is about 1 or more.

It has been proposed that various metal elements be added to the material alloy of a nanocomposite magnet to improve the magnetic properties thereof. See, for example, Japanese Laid-Open Publication No. 3-261104, U.S. Pat. No. 4,836,868, Japanese Laid-Open Publication No. 7-122412, PCT International Publication No. WO 00/03403 and W. C. Chan et. al., "The Effects of Refractory Metals on the Magnetic Properties of α-Fe/R2Fe14B-type Nanocomposites", IEEE Trans. Magn. No. 5, INTERMAG. 99, Kyongiu, Korea, pp. 3265-3267, 1999. However, none of these proposed techniques are reliable enough to always obtain a sufficient "characteristic value per cost". More specifically, none of the nanocomposite magnets produced by these techniques realize a coercivity that is high enough to actually use it in various applications. Thus, none of these magnets can exhibit commercially viable magnetic properties.

SUMMARY OF THE INVENTION

In order to overcome the problems described above, preferred embodiments of the present invention provide a nanocomposite magnet that achieves a coercivity $H_{cJ}$ that is high enough to actually use it in many various applications (e.g., $H_{cJ} \geq 480$ kA/m) while maintaining a remanence $B_r$ of at least about 0.7 T, and also provide a nanocomposite magnet that can be produced by a method that is more cost-effective than conventional methods.

A nanocomposite magnet according to preferred embodiments of the present invention preferably has a composition represented by the general formula: $(Fe_{1-m}T_m)_{100-x-y-z-n}Q_xR_yTi_zM_n$, where T is at least one element selected from the group consisting of Co and Ni, Q is at least one element selected from the group consisting of B and C, R is at least one rare earth element that always includes at least one of Nd and Pr and optionally includes Dy and/or Tb, and M is at least one element selected from the group consisting of Al, Si, V, Cr, Mn, Cu, Zn, Ga, Zr, Nb, Mo, Ag, Hf, Ta, W, Pt, Au and Pb. The mole fractions x, y, z, m and n preferably satisfy the inequalities of 10 at %<x≦20 at %, 6 at %≦y<10 at %, 0.5 at %≦z≦12 at %, 0≦m≦0.5, and 0 at %≦n≦10 at %, respectively. The nanocomposite magnet preferably has an oxygen content of at most about 1,500 ppm by mass.

In one preferred embodiment of the present invention, the nanocomposite magnet preferably includes at least two ferromagnetic crystalline phases including a hard magnetic phase and a soft magnetic phase. The hard magnetic phase preferably has an average grain size of about 5 nm to about 200 nm while the soft magnetic phase preferably has an average grain size of about 1 nm to about 50 nm.

In this particular preferred embodiment, the hard magnetic phase preferably includes an $R_2Fe_{14}B$ phase.

In another preferred embodiment of the present invention, the nanocomposite magnet may exhibit hard magnetic properties including a remanence $B_r$ of at least about 0.7 T and a coercivity $H_{cJ}$ of at least about 480 kA/m.

More preferably, the nanocomposite magnet has an oxygen content of at most about 700 ppm by mass.

Even more preferably, the nanocomposite magnet has a nitrogen content of at most about 400 ppm by mass.

In that case, the nanocomposite magnet may exhibit hard magnetic properties including a remanence $B_r$ of at least about 0.8 T and a coercivity $H_{cJ}$ of at least about 550 kA/m.

A nanocomposite magnet according to other preferred embodiments of the present invention preferably has a composition represented by the general formula: $(Fe_{1-m}T_m)_{100-x-y-z-n}Q_xR_yTi_zM_n$, where T is at least one element selected from the group consisting of Co and Ni, Q is at least one element selected from the group consisting of B and C, R is at least one rare earth element that always includes at least one of Nd and Pr and optionally includes Dy and/or Tb, and M is at least one element selected from the group consisting of Al, Si, V, Cr, Mn, Cu, Zn, Ga, Zr, Nb, Mo, Ag, Hf, Ta, W, Pt, Au and Pb. The mole fractions x, y, z, m and n preferably satisfy the inequalities of 10 at %<x≦20 at %, 6 at %≦y<10 at %, 0.5 at %≦z≦12 at %, 0≦m≦0.5, and 0 at %≦n≦10 at %, respectively. The nanocomposite magnet preferably has a nitrogen content of at most about 400 ppm by mass.

In one preferred embodiment of the present invention, the nanocomposite magnet preferably includes at least two ferromagnetic crystalline phases including a hard magnetic phase and a soft magnetic phase. The hard magnetic phase preferably has an average grain size of about 5 nm to about 200 nm. The soft magnetic phase preferably has an average grain size of about 1 nm to about 50 nm.

In this particular preferred embodiment, the hard magnetic phase preferably includes an $R_2Fe_{14}B$ phase (i.e., a hard magnetic phase with an $R_2Fe_{14}B$ crystalline structure).

Other features, elements, processes, steps, characteristics and advantages of the present invention will become more apparent from the following detailed description of preferred embodiments of the present invention.

DETAILED DESCRIPTION FO THE PREFERRED EMBODIMENTS

Figure 1:
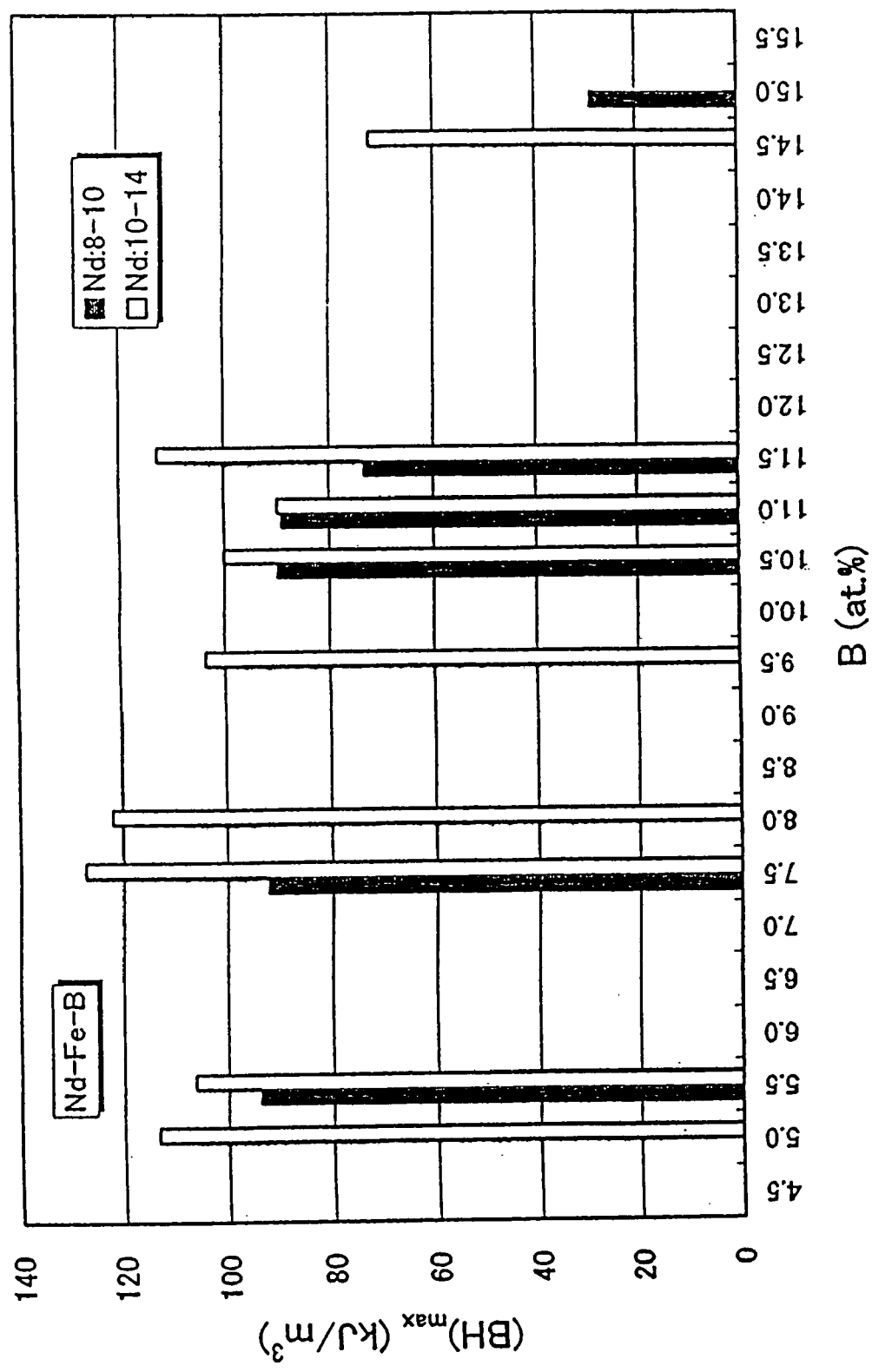
FIG. 1 is a graph showing a relationship between the maximum energy product $(BH)_{max}$ and the concentration of boron in an Nd—Fe—B based nanocomposite magnet to which no Ti is added, where the white bars represent data relating to samples containing Nd in an amount of about 10 at % to about 14 at % and the black bars represent data relating to samples containing Nd in an amount of about 8 at % to about 10 at %.

A nanocomposite magnet according to a preferred embodiment of the present invention is formed by rapidly cooling and solidifying a melt of a rare earth element-iron-boron based material alloy containing Ti. The rapidly solidified alloy obtained in this manner typically includes crystalline phases. However, if necessary, the alloy is heated and further crystallized. A rapidly solidified alloy that should include B (or C) at a mole fraction x of more than about 10 at % in a resultant nanocomposite magnet is easily amorphized and may sometimes include almost no crystalline phases just after its material alloy has been cooled and solidified. However, even such an alloy is crystallized when subjected to a heat treatment process.

The present inventors discovered and confirmed via experiments that when Ti is added to an iron-based rare earth alloy with a composition defined by a particular combination of mole fraction ranges, the crystal growth of an α-Fe phase, often observed while the melt is cooled, is minimized, and instead the crystal growth of an $R_2Fe_{14}B$ phase (i.e., a hard magnetic phase with an $R_2Fe_{14}B$ crystalline structure), which will contribute to the hard magnetic properties of the resultant magnet, can proceed preferentially and uniformly. The basic idea of preferred embodiments of the present invention is based on this discovery. In the specific preferred embodiments of the present invention to be described below, crystalline phases are supposed to be produced right after the melt of the material alloy has been cooled and solidified. However, the present inventors confirmed via experiments that even if the as-solidified alloy is amorphous, a similar nanocrystalline structure still can be formed by a similar action of the additive Ti during the subsequent heat treatment process for crystallization and a desired nanocomposite magnet having excellent magnetic properties still can be obtained.

As used herein, the "nanocomposite magnet" also refers to an alloy having a nanocomposite structure that expresses exchange interactions. Accordingly, the "nanocomposite magnet" herein includes a rapidly solidified alloy having such a nanocomposite structure (which will be herein also referred to an "as-solidified alloy" simply), an alloy with such a nanocomposite structure created by subjecting an amorphous rapidly solidified alloy to a heat treatment process, and a magnet powder obtained by pulverizing either the as-solidified alloy or the thermally treated alloy. It should be noted that the heat treatment process to create the nanocomposite structure may be carried out either before or after the rapidly solidified alloy is pulverized.

If R has a mole fraction of less than about 10 at % and B (or C) has a mole fraction of more than about 10 at %, then the $\alpha$-Fe phase easily nucleates and grows faster and earlier than an $Nd_2Fe_{14}B$ phase with hard magnetic properties unless Ti is added to the material alloy. Accordingly, when the rapidly solidified alloy having such a composition (i.e., including no Ti) has been thermally treated, the $\alpha$-Fe phase with soft magnetic properties will have grown excessively.

In contrast, where Ti is added to the material alloy, the crystallization kinetics of the $\alpha$-Fe phase would be slowed down, i.e., it would take a longer time for the $\alpha$-Fe phase to nucleate and grow. Thus, the present inventors believe that the $Nd_2Fe_{14}B$ phase would start to nucleate and grow before the $\alpha$-Fe phase has grown coarsely. For that reason, where Ti is added, the $Nd_2Fe_{14}B$ phase can be grown sufficiently and distributed uniformly before the $\alpha$-Fe phase grows too much. Furthermore, the present inventors also believe that if Ti is added to the material alloy, almost no Ti is included in the $Nd_2Fe_{14}B$ phase but most of Ti is present in the iron-based boride or in the interface between the $Nd_2Fe_{14}B$ phase and the iron-based boride phase to stabilize the iron-based boride.

According to preferred embodiments of the present invention, the additive Ti contributes to significant reduction in grain sizes of the soft magnetic phases (e.g., iron-based boride and $\alpha$-Fe phases), uniform distribution of the $Nd_2Fe_{14}B$ phase and increase in the volume percentage of the $Nd_2Fe_{14}B$ phase. Consequently, the resultant nanocomposite magnet can have significantly increased coercivity and magnetization (or remanence) and remarkably improved loop squareness of its demagnetization curve.

Hereinafter, a nanocomposite magnet according to a preferred embodiment of the present invention will be described in further detail.

Specifically, a nanocomposite magnet according to a first preferred embodiment of the present invention preferably has a composition represented by the general formula: $(Fe_{1-m}T_m)_{100-x-y-z-n}Q_xR_yTi_zM_n$, where T is at least one element selected from the group consisting of Co and Ni, Q is at least one element selected from the group consisting of B (boron) and C (carbon), R is at least one rare earth element that always includes at least one of Nd and Pr and optionally includes Dy and/or Tb, and M is at least one element selected from the group consisting of Al, Si, V, Cr, Mn, Cu, Zn, Ga, Zr, Nb, Mo, Ag, Hf, Ta, W, Pt, Au and Pb. The mole fractions x, y, z, m and n preferably satisfy the inequalities of 10 at %<x≦20 at %, 6 at %≦y<10 at %, 0.5 at %≦z≦12 at %, 0≦m≦0.5 and 0 at %≦n≦10 at %, respectively. Furthermore, the nanocomposite magnet according to the first preferred embodiment of the present invention preferably has an oxygen content of at most about 1,500 ppm by mass.

The nanocomposite magnet according to the first preferred embodiment of the present invention includes a rare earth element present in an amount that is equal to as small a mole fraction as less than about 10 at %. However, since Ti is added to the material alloy thereof, the nanocomposite magnet achieves the unexpected effects of maintaining, or even increasing, the magnetization (remanence $B_r$) and improving the loop squareness of the demagnetization curve thereof compared to a magnet made from an alloy including no Ti.

In a nanocomposite magnet according to a preferred embodiment of the present invention, the soft magnetic phases, which are present (as boundary phases or sub-boundary phases) around the hard magnetic phases, have an average grain size of about 50 nm or less. Accordingly, the soft and hard magnetic phases are magnetically coupled together through exchange interactions. For that reason, even though soft magnetic phases such as iron-based boride and $\alpha$-Fe phases are included therein in addition to the hard magnetic $R_2Fe_{14}B$ phases, the alloy as a whole can exhibit excellent squareness at the demagnetization curve thereof. It should be noted that the average grain size of the soft magnetic phases is smaller than that of the hard magnetic phases.

The nanocomposite magnet according to the present preferred embodiment of the present invention preferably includes iron-based boride and $\alpha$-Fe phases with saturation magnetization that is approximately equal to, or even higher than, that of the $R_2Fe_{14}B$ phase. Examples of the iron-based borides include $Fe_3B$ (with a saturation magnetization of about 1.5 T; where $Fe_3B$ herein includes $Fe_{3.5}B$) and $Fe_{23}B_6$ (with a saturation magnetization of about 1.6 T). In this case, the $R_2Fe_{14}B$ phase has a saturation magnetization of about 1.6 T when R is Nd, and the $\alpha$-Fe phase has a saturation magnetization of about 2.1 T.

Normally, where the mole fraction x of Q (which is C and/or B) is greater than about 10 at % and the mole fraction y of the rare earth element R is from about 5 at % to about 9 at %, $R_2Fe_{23}B_3$ is produced. However, even when a material alloy with such a composition is used, the addition of Ti produces an $R_2Fe_{14}B$ phase, not the $R_2Fe_{23}B_3$ phase, and iron-based boride phases with soft magnetic properties such as $Fe_{23}B_6$ and $Fe_3B$ phases. That is to say, the additive Ti increases the volume percentage of the $R_2Fel_4B$ phase, and the iron-based boride phases produced contribute to increasing the magnetization.

As a result of experiments, the present inventors discovered that only when Ti was added, the magnetization did not decrease but rather increased as opposed to any other metal element additive such as V, Cr, Mn, Nb or Mo. Also, when Ti was added, the loop squareness of the demagnetization curve was much better than that obtained by adding any of the elements cited above.

Furthermore, these effects achieved by the additive Ti are particularly remarkable when the concentration of B is greater than about 10 at %. Hereinafter, this point will be described with reference to FIGS. 1 and 2.

Figure 2:
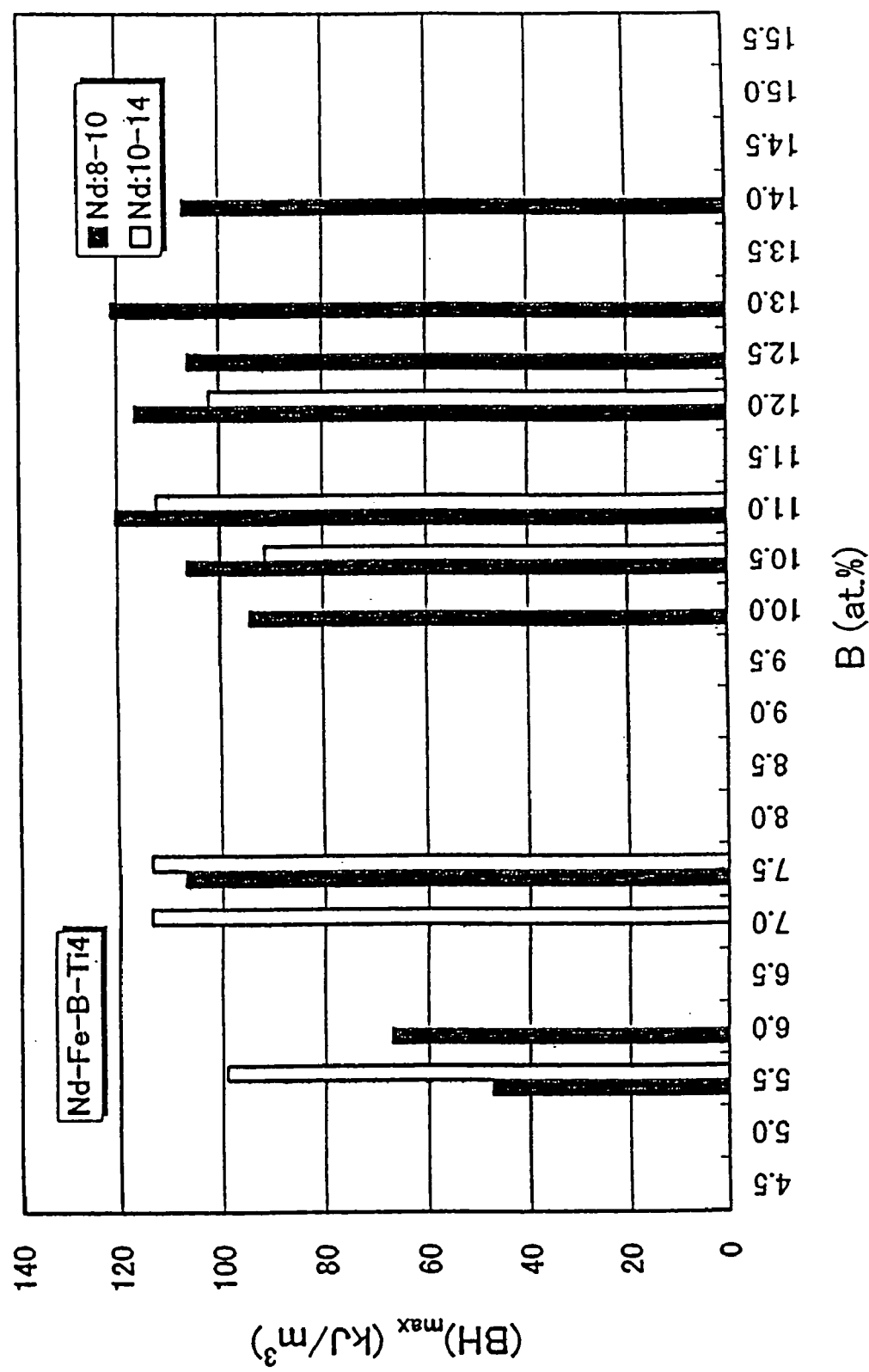
FIG. 2 is a graph showing a relationship between the maximum energy product $(BH)_{max}$ and the concentration of boron in an Nd—Fe—B based nanocomposite magnet to which Ti is added, where the white bars also represent data relating to samples containing Nd in an amount of about 10 at % to about 14 at % and the black bars also represent data about samples containing Nd in an amount of about 8 at % to about 10 at %.

FIG. 1 is a graph showing a relationship between the maximum energy product $(BH)_{max}$ and the concentration of boron in an Nd—Fe—B based magnet to which no Ti is added. In FIG. 1, the white bars represent data relating to samples containing Nd in an amount of about 10 at % to about 14 at %, while the black bars represent data relating to samples containing Nd in an amount of about 8 at % to about 10 at %. On the other hand, FIG. 2 is a graph showing a relationship between the maximum energy product $(BH)_{max}$ and the concentration of boron in an Nd—Fe—B based magnet to which Ti is added. In FIG. 2, the white bars also represent data relating to samples containing Nd in an amount of about 10 at % to about 14 at %, while the black bars also represent data relating to samples containing Nd in an amount of about 8 at % to about 10 at %.

As can be seen from FIG. 1, once the concentration of boron exceeds about 10 at %, the samples including no Ti have decreased maximum energy products $(BH)_{max}$ no matter how much Nd is contained therein. Where the concentration of Nd is about 8 at % to about 10 at %, this decrease is particularly noticeable. This tendency has been well known in the art and it has been widely believed that any permanent magnet, including an $Nd_2Fe_{14}B$ phase as its primary phase, should not contain more than about 10 at % of boron. For instance, U.S. Pat. No. 4,836,868 discloses a working example in which the concentration of boron is set to about 5 at % to about 9.5 at %. This patent teaches that the concentration of boron is preferably about 4 at % to less than about 12 at %, more preferably about 4 at % to about 10 at %.

In contrast, as can be seen from FIG. 2, the samples including the additive Ti have increased maximum energy products $(BH)_{max}$ in a certain range where the B concentration is greater than about 10 at %. This increase is particularly remarkable where the Nd concentration is about 8 at % to about 10 at %.

Thus, the present invention reverses the conventional misconception that a B concentration of greater than about 10 at % should degrade the magnetic properties, and achieves the unexpected results just by adding Ti to the material alloy.

Furthermore, the nanocomposite magnet according to the first preferred embodiment of the present invention preferably has an oxygen content of at most about 1,500 ppm by mass and exhibits hard magnetic properties including a remanence $B_r$ of at least about 0.7 T and a coercivity $H_{cJ}$ of at least about 480 kA/m.

In the $R_2Fe_{14}B$ phase that contributes to the hard magnetic properties of the nanocomposite magnet according to the present preferred embodiment of the present invention, the rare earth element thereof exhibits high activation energy against oxygen and is easily oxidizable. Thus, the present inventors discovered and confirmed via experiments that the magnet (or its material alloy) should have an oxygen content of no greater than about 1,500 ppm to increase the volume percentage of the $R_2Fe_{14}B$ phase to the minimum required level (preferably at least about 50 vol %, more preferably at least about 60 vol %) for reducing the unwanted rare earth oxides and achieving the desired hard magnetic properties.

This is because if the nanocomposite magnet has an oxygen content of more than about 1,500 ppm, then various types of rotating machines and actuators, including such a magnet, may not achieve their required magnetic properties (including $B_r$ of at least about 0.7 T and $H_{cJ}$ of at least about 480 kA/m). For that reason, the oxygen content of the nanocomposite magnet is preferably at most about 900 ppm, more preferably at most about 700 ppm.

To achieve sufficient magnetic properties, the lowest oxygen content of the nanocomposite magnet according to the first preferred embodiment of the present invention is preferably close to about 20 ppm (i.e., the minimum possible value that is normally achievable). However, even if the oxygen content is about 100 ppm or more, the magnetic properties usually do not degrade so seriously. Thus, the nanocomposite magnet may have an oxygen content of about 100 ppm or more. Furthermore, if the nanocomposite magnet may have an oxygen content of about 200 ppm or more, then the melt crucible, which is used to prepare the molten alloy, may reach a vacuum of at most about $10^{-1}$ Pa. Then, the equipment cost, and eventually the overall manufacturing cost as well, can be reduced significantly. Furthermore, in that case, a vacuum of a required level can be created in a shorter time and the equipment can be operated more efficiently. Thus, the manufacturing cost can be reduced. Also, if the nanocomposite magnet has an oxygen content of about 100 ppm to about 700 ppm, then $B_r$ of such a nanocomposite magnet is about 97% or more of the average $B_r$ value of a nanocomposite magnet having an oxygen content of about 10 ppm to about 100 ppm. Thus, no serious degradation is observed in the resultant magnetic properties.

Furthermore, the nanocomposite magnet according to the first preferred embodiment of the present invention preferably has a nitrogen content of at most about 400 ppm. More particularly, if the oxygen and nitrogen contents of the nanocomposite magnet are controlled to about 700 ppm or less and about 400 ppm or less, respectively, then the nanocomposite magnet exhibits the desired hard magnetic properties including a remanence $B_r$ of at least about 0.8 T and a coercivity $H_{cJ}$ of at least about 550 kA/m.

If necessary, the nanocomposite magnet according to the first preferred embodiment of the present invention may be produced by thermally treating the rapidly solidified material alloy thereof. However, the rapidly solidified alloy includes a rare earth element, which is activated against oxygen, as one of its principal elements. Accordingly, the heat treatment atmosphere is preferably a vacuum of about 10 Pa or less, a rare gas of argon, for example, or nitrogen. However, if the heat treatment is conducted within a vacuum of about 10 Pa or less, the alloy may not be heated uniformly enough inside the furnace, and the resultant magnetic properties may deteriorate. A rare gas such as argon gas is at least 10 times more expensive than nitrogen gas. Thus, the use of a rare gas increases the process cost significantly. Accordingly, to reduce the cost of the heat treatment process, the alloy is preferably thermally treated within a nitrogen atmosphere. Nevertheless, if the rapidly solidified alloy is thermally treated in a nitrogen atmosphere, then the resultant nanocomposite magnet should include nitrogen and might exhibit deteriorated magnetic properties. Thus, the present inventors carried out experiments to find optimum conditions for the heat treatment in a nitrogen atmosphere, which should be adopted to cut down the manufacturing cost of the nanocomposite magnet according to the first preferred embodiment of the present invention. As a result, the present inventors discovered that when the heat treatment conditions were defined such that the resultant nanocomposite magnet had a nitrogen content of no greater than about 400 ppm, even the heat treatment in the nitrogen atmosphere resulted in just slightly deteriorated magnetic properties.

More preferably, the nanocomposite magnet according to the first preferred embodiment of the present invention has a nitrogen content of at most about 200 ppm, even more preferably at most about 150 ppm, and most preferably at most about 70 ppm. The molten alloy being rapidly cooled and solidified includes nitrogen at about 10 ppm to about 20 ppm. Thus, the lowest possible nitrogen content of the nanocomposite magnet is defined as about 10 ppm. The nitrogen content of the magnet should not be lower than about 10 ppm considering the resolution of an analyzer that is currently available. That is to say, a nitrogen content of less than about 10 ppm is usually non-measurable by a normal analyzer.

As described above, the nanocomposite magnet according to the first preferred embodiment of the present invention has a reduced oxygen content. Thus, if the nitrogen content thereof is controlled to about 400 ppm or less, the nanocomposite magnet can exhibit excellent hard magnetic properties including a remanence $B_r$ of at least about 0.8 T and a coercivity $H_{cJ}$ of at least about 550 kA/m. However, it is not only when the magnet has an oxygen content of about 1,500 ppm or less that a nitrogen content of greater than about 400 ppm results in steep degradation of the magnetic properties. Also, the process cost can always be reduced by conducting a heat treatment process within a nitrogen atmosphere, not a rare gas atmosphere, irrespective of the magnetic properties (or oxygen content) of the nanocomposite magnet.

Specifically, a nanocomposite magnet according to a second preferred embodiment of the present invention preferably has a composition represented by the general formula: $(Fe_{1-m}T_m)_{100-x-y-z-n}Q_xR_yTi_zM_n$, where T is at least one element selected from the group consisting of Co and Ni, Q is at least one element selected from the group consisting of B and C, R is at least one rare earth element that always includes at least one of Nd and Pr and optionally includes Dy and/or Tb, and M is at least one element selected from the group consisting of Al, Si, V, Cr, Mn, Cu, Zn, Ga, Zr, Nb, Mo, Ag, Hf, Ta, W, Pt, Au and Pb. The mole fractions x, y, z, m and n preferably satisfy the inequalities of 10 at %<x≦20 at %, 6 at %≦y<10 at %, 0.5 at %≦z≦12 at %, 0≦m≦0.5 and 0 at %≦n≦10 at %, respectively. The nanocomposite magnet preferably has a nitrogen content of at most about 400 ppm by mass. The nanocomposite magnet may be produced by subjecting its material alloy to a heat treatment process within a nitrogen atmosphere. Also, if the oxygen content of the nanocomposite magnet is controlled to fall within the above-specified range, even a nanocomposite magnet obtained by subjecting the material alloy to a heat treatment process within a nitrogen atmosphere still achieves excellent hard magnetic properties including a remanence $B_r$ of at least about 0.8 T and a coercivity $H_{cJ}$ of at least about 550 kA/m.

Next, it will be described how to produce a nanocomposite magnet according to a preferred embodiment of the present invention.

First, a melt of the iron-based rare earth alloy having a composition represented by the general formula $(Fe_{1-m}T_m)_{100-x-y-z-n}Q_xR_yTi_zM_n$ (where 10 at %<x≦20 at %, 6 at %≦y<10 at %, 0.5 at %≦z≦12 at %, 0≦m≦0.5 and 0 at %≦n≦10 at %) is rapidly cooled within an inert atmosphere, thereby preparing a rapidly solidified alloy including an $R_2Fe_{14}B$ phase at about 60 volume % or more. The average grain size of the $R_2Fe_{14}B$ phase in the quenched alloy is about 80 nm or less, for example. If necessary, this quenched alloy may be heat-treated. Then, the amorphous phases remaining in the rapidly solidified alloy can be crystallized. It should be noted that if the mole fraction x of Q exceeds about 10 at %, then amorphous phases are easily produced and most of the resultant rapidly solidified alloy may sometimes consist of amorphous phases. Even so, by subjecting the resultant rapidly solidified alloy to a heat treatment process, the $R_2Fe_{14}B$ phase can be produced at a volume percentage of about 50% or more and desired magnetic properties are achievable. However, the molten alloy is preferably rapidly cooled and solidified at a cooling rate of about $10^{2°}$ C./s to about $10^{5°}$ C./s. Then, the desired nanocrystalline structure can be produced and the $R_2Fe_{14}B$ phase can be easily nucleated.

In a preferred embodiment in which a melt spinning process or a strip casting process is carried out by using a chill roller, the molten alloy is preferably rapidly cooled within an atmosphere having a pressure of about 1.3 kPa or more. Then, the molten alloy is not just rapidly cooled through the contact with the chill roller but also further cooled appropriately due to the secondary cooling effects caused by the atmospheric gas even after the solidified alloy has left the roller.

According to the results of experiments the present inventors carried out, while the rapid cooling process is performed, the atmospheric gas should have its pressure controlled preferably at about 1.3 kPa or more but the atmospheric pressure (=101.3 kPa) or less, more preferably about 10 kPa to about 90 kPa, and even more preferably about 20 kPa to about 60 kPa.

Where the atmospheric gas has a pressure falling within any of these preferred ranges, the surface velocity of the chill roller is preferably about 4 m/s to about 50 m/s. This is because if the roller surface velocity is lower than about 4 m/s, then the $R_2Fe_{14}B$ phase, included in the rapidly solidified alloy, will have excessively large crystal grains. In that case, the $R_2Fe_{14}B$ phase will further increase its grain size when thermally treated, thus possibly deteriorating the resultant magnetic properties.

According to the experimental results the present inventors obtained, the roller surface velocity is more preferably about 5 m/s to about 30 m/s, even more preferably about 5 m/s to about 20 m/s.

When a material alloy having the composition of the nanocomposite magnet according to the present preferred embodiment of the present invention is rapidly cooled and solidified, the rapidly solidified alloy has either a structure in which almost no α-Fe phase with an excessively large grain size precipitates but a microcrystalline $R_2Fe_{14}B$ phase exists instead or a structure in which the microcrystalline $R_2Fe_{14}B$ phase and an amorphous phase coexist. Accordingly, when such a rapidly solidified alloy is thermally treated, a high-performance nanocomposite magnet, in which soft magnetic phases such as iron-based boride phases are dispersed finely or distributed uniformly on the grain boundary between the hard magnetic phases, will be obtained. As used herein, the "amorphous phase" means not only a phase in which the atomic arrangement is sufficiently disordered but also a phase including embryos for crystallization, extremely small crystalline regions (with a size of several nanometers or less), and/or atomic clusters. More specifically, the "amorphous phase" herein means a phase of which the crystal structure cannot be defined by an X-ray diffraction analysis or a TEM observation.

In the prior art, even when one tries to obtain a rapidly solidified alloy including about 60 volume % or more of $R_2Fe_{14}B$ phase by rapidly cooling a molten alloy with a composition that is similar to that of the nanocomposite magnet of preferred embodiments of the present invention but that includes no Ti, the resultant alloy will have a structure in which a lot of α-Fe phase has grown coarsely. Thus, when the alloy is heated and crystallized after that, the α-Fe phase will increase its grain size excessively. Once soft magnetic phases, including the α-Fe phase, have grown too much, the magnetic properties of the alloy deteriorate significantly, thus making it virtually impossible to produce a quality bonded magnet out of such an alloy.

Particularly with a material alloy containing B at a relatively high percentage like the material alloy for the nanocomposite magnet of preferred embodiments of the present invention, even if the molten alloy is cooled at a low rate, crystalline phases cannot be produced so easily according to the conventional method. This is because the B-rich molten alloy highly likely creates an amorphous phase. For that reason, in the prior art, even if one tries to make a rapidly solidified alloy including 60 volume % or more of $R_2Fe_{14}B$ phase by decreasing the cooling rate of the melt sufficiently, not only the $R_2Fe_{14}B$ phase but also the $\alpha$-Fe phase or its precursor will precipitate a lot. Thus, when that alloy is heated and crystallized after that, the $\alpha$-Fe phase will further grow to deteriorate the magnetic properties of the alloy seriously.

Thus, it was widely believed that the best way of increasing the coercivity of a material alloy for a nanocomposite magnet was cooling a melt at an increased rate to amorphize most of the rapidly solidified alloy first and then forming a highly fine and uniform structure by heating and crystallizing the amorphous phases. This is because in conventional methods, it was taken for granted that there was no other alternative but crystallizing the amorphous phases through an easily controllable heat treatment process and reducing the overall size of the structure including the soft and hard magnetic phases to obtain a nanocomposite magnet having an alloy structure in which soft magnetic phases, having a grain size of as small as about 50 nm or less, are dispersed and can be coupled magnetically with the hard magnetic phases via exchange interactions.

Based on this popular belief, W. C. Chan et al., reported a technique of obtaining $Nd_2Fe_{14}B$ and $\alpha$-Fe phases with grain sizes on the order of several tens nm. According to Chan's technique, La, which excels in producing the amorphous phases, is added to a material alloy. Next, the material alloy is melt quenched to obtain a rapidly solidified alloy mainly composed of the amorphous phases. And then the alloy is heated and crystallized. See W. C. Chan et al., "The Effects of Refractory Metals on the Magnetic Properties of $\alpha$-Fe/$R_2Fe_{14}B$-type Nanocomposites", IEEE Trans. Magn. No. 5, INTERMAG. 99, Kyongiu, Korea, pp. 3265-3267, 1999. This article also teaches that adding a refractory metal element such as Ti in a very small amount (e.g., about 2 at %) improves the magnetic properties and that the mole fraction of Nd, rare earth element, is preferably increased from about 9.5 at % to about 11.0 at % to reduce the grain sizes of the $Nd_2Fe_{14}B$ and $\alpha$-Fe phases. The refractory metal is added to prevent borides such as $R_2Fe_{23}B_3$ and $Fe_3B$ from being produced and to make a material alloy for a magnet powder consisting essentially of $Nd_2Fe_{14}B$ and $\alpha$-Fe phases only.

In contrast, in the nanocomposite magnet according to preferred embodiments of the present invention, the additive Ti minimizes the nucleation of the $\alpha$-Fe phase during the rapid solidification process. In addition, the additive Ti also produces soft magnetic phases such as iron-based borides and yet minimizes the grain growth thereof during the heat treatment process for crystallization. As a result, a nanocomposite magnet having excellent magnetic properties can be obtained.

According to preferred embodiments of the present invention, even though the material alloy includes a rare earth element at a relatively low percentage (i.e., about 9 at % or less), a magnet powder, exhibiting high magnetization (or remanence) and coercivity and showing excellent loop squareness at its demagnetization curve, can be obtained.

As described above, the coercivity of the nanocomposite magnet of preferred embodiments of the present invention is increased by making the $Nd_2Fe_{14}B$ phase nucleate and grow faster and earlier in the cooling process so that the $Nd_2Fe_{14}B$ phase increases its volume percentage and yet by minimizing the grain coarsening of the soft magnetic phases. Also, the magnetization thereof increases because the additive Ti can produce a boride phase (e.g., ferromagnetic iron-based borides) from the B-rich amorphous phases existing in the rapidly solidified alloy and can increase the volume percentage of the ferromagnetic phases in the heated and crystallized alloy.

The rapidly solidified alloy obtained in this manner is preferably heated and crystallized depending on the necessity to form a structure with three or more crystalline phases including $R_2Fe_{14}B$, boride and $\alpha$-Fe phases. The heat treatment is preferably conducted with its temperature and duration controlled in such a manner that the $R_2Fe_{14}B$ phase will have an average crystal grain size of about 5 nm to about 200 nm and that the boride and $\alpha$-Fe phases will have an average crystal grain size of about 1 nm to about 50 nm. The $R_2Fe_{14}B$ phase normally has an average crystal grain size of about 30 nm or more, which may be about 50 nm or more depending on the conditions. On the other hand, the soft magnetic phases, such as boride and $\alpha$-Fe phases, often have an average crystal grain size of about 30 nm or less and typically several nanometers at most.

Figure 3:
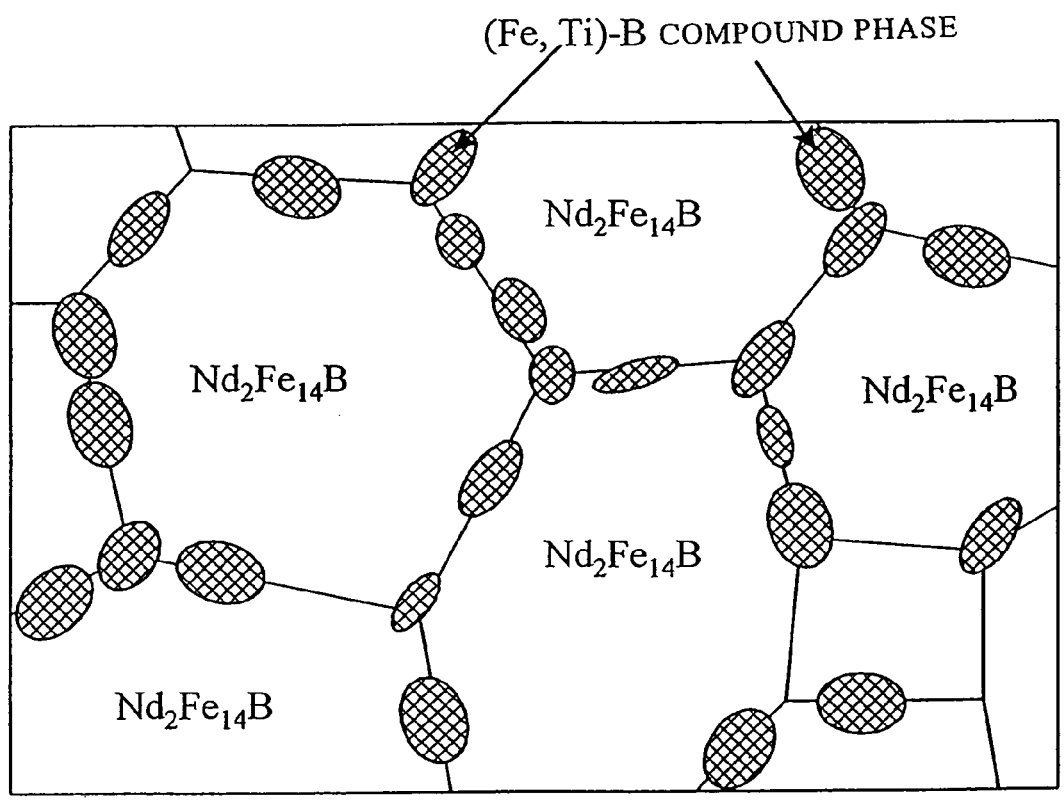
FIG. 3 schematically illustrates $R_2Fe_{14}B$ and (Fe, Ti)—B phases included in the magnet of various preferred embodiments of the present invention.

In the nanocomposite magnet of preferred embodiments of the present invention, the $R_2Fe_{14}B$ phase has an average crystal grain size that is greater than that of the soft magnetic phases. FIG. 3 schematically illustrates the metal structure of the nanocomposite magnet. As shown in FIG. 3, fine soft magnetic phases are distributed on the grain boundary of relatively large $R_2Fe_{14}B$ phases. Even though the $R_2Fe_{14}B$ phase has a relatively large average grain size, the soft magnetic phases have a sufficiently small average grain size because the crystal growth thereof has been minimized. Accordingly, these constituent phases are magnetically coupled together through exchange interactions and the magnetization directions of the soft magnetic phases are constrained by the hard magnetic phase. Consequently, the alloy as a whole can exhibit excellent loop squareness at its demagnetization curve.

In the manufacturing process described above, borides are easily produced. The reason is believed to be as follows. When a rapidly solidified alloy, mostly composed of the $R_2Fe_{14}B$ phase, is made from a material alloy having a composition in which R is less than about 10 at % and Q (i.e., B and/or C) exceeds about 10 at %, the amorphous phases existing in the solidified alloy should contain an excessive amount of boron. Accordingly, when the alloy is heated and crystallized, that boron will bond to other elements easily, thus nucleating and growing in profusion. However, if that boron, contained in the amorphous phases before the heat treatment, bonds to other elements and produces compounds with low magnetization, then the alloy as a whole will have decreased magnetization.

The present inventors discovered and confirmed via experiments that only when Ti was added, the magnetization did not decrease but rather increased as opposed to any other metal element additive such as V, Cr, Mn, Nb or Mo. Also, the additive Ti improved the loop squareness of the demagnetization curve far better than any of the elements cited above did. Accordingly, the present inventors believe that Ti plays a key role in minimizing the production of borides with low magnetization. Particularly when relatively small amounts of B and Ti are included, iron-based borides with ferromagnetic properties will easily grow while the alloy is heat-treated. In that case, boron included in the amorphous phases would be absorbed into the iron-based borides. For that reason, the amorphous phases, remaining even in the alloy that has been heated and crystallized, decrease their volume percentage but the ferromagnetic crystalline phase increases its volume percentage instead, thus increasing the remanence $B_r$.

Hereinafter, this point will be further discussed with reference to FIG. 4.

Figure 4:
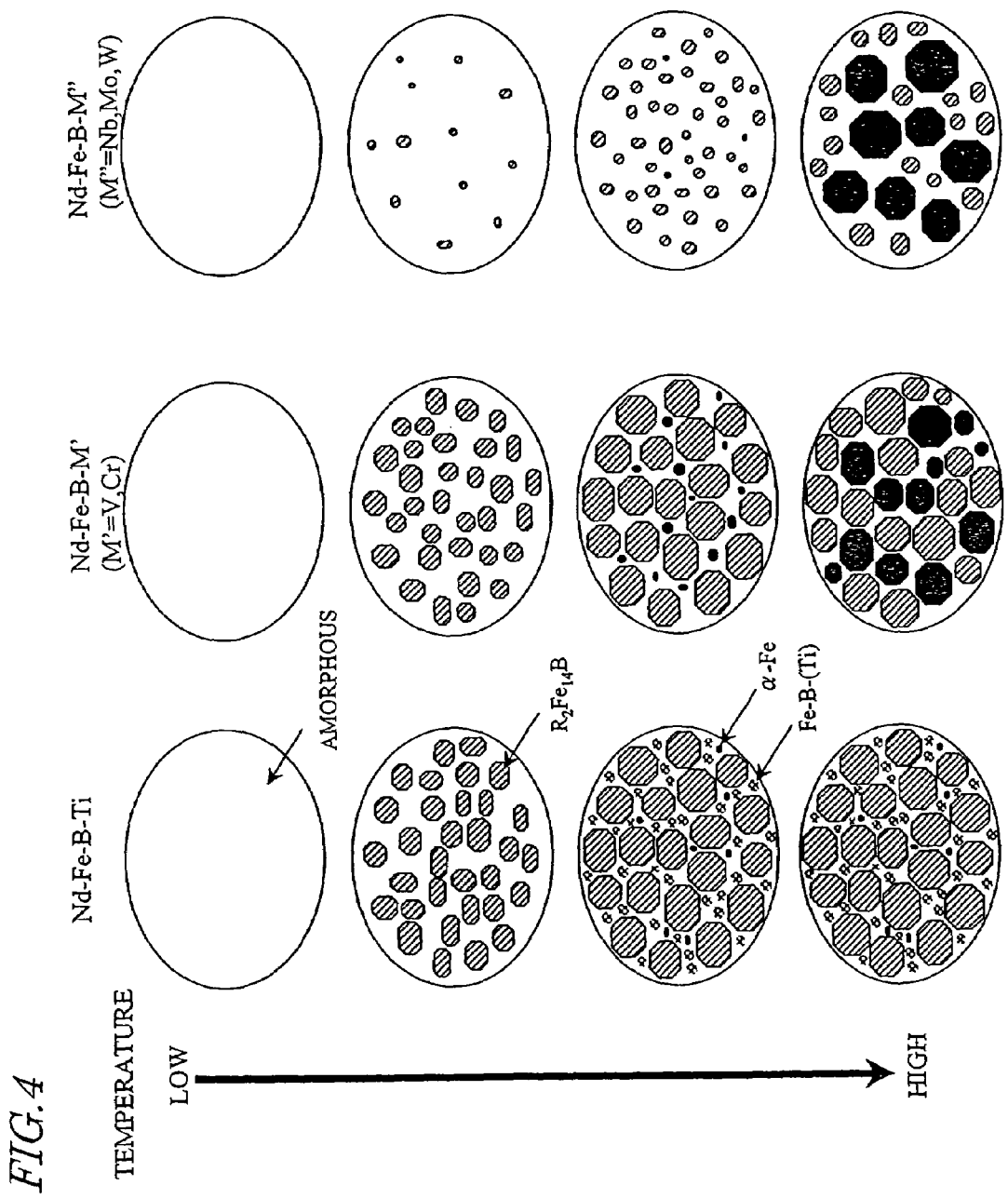
FIG. 4 schematically shows how three types of rapidly solidified alloys having a composition including additive Ti, a composition including V or Cr as an alternative additive and a composition including Nb, Mo or W as another alternative additive, respectively, change their microcrystalline structures during the crystallization processes thereof.

FIG. 4 schematically illustrates how three types of rapidly solidified alloys having a composition including additive Ti, a composition including V or Cr as an alternative additive and a composition including Nb, Mo or W as another alternative additive, respectively, change their microstructures during the crystallization processes thereof. Where Ti is added, the grain growth of the soft magnetic phases is minimized in a temperature range exceeding the temperature at which the α-Fe phase grows rapidly. As a result, excellent hard magnetic properties can be maintained. In contrast, where any of the other metal elements (e.g., Nb, V, Cr, etc.) is added, the grain growth of the respective constituent phases advances remarkably and the exchange interactions among those phases weakens in the relatively high temperature range in which the α-Fe phase grows rapidly. As a result, the resultant demagnetization curves have decreased loop squareness.

First, the situation where Nb, Mo or W is added will be described. In this case, if the alloy is thermally treated in a relatively low temperature range where no α-Fe phase precipitates, then good hard magnetic properties, including superior loop squareness of the demagnetization curve, are achievable. In an alloy that was heat-treated at such a low temperature, however, $R_2Fe_{14}B$ microcrystalline phases would be dispersed in the amorphous phases, and the alloy does not have the nanocomposite magnet structure and would not exhibit high magnetization. Also, if the alloy is heat-treated at an even higher temperature, then the α-Fe phase nucleates and grows out of the amorphous phases. Unlike the situation where Ti is added, the α-Fe phase rapidly grows and increases its grain size excessively. As a result, the exchange interactions among the constituent phases weaken and the loop squareness of the demagnetization curve deteriorates significantly.

On the other hand, where Ti is added, a nanocomposite structure, including microcrystalline $R_2Fe_{14}B$, iron-based boride, α-Fe and amorphous phases, can be obtained by heat-treating the alloy, and the respective constituent phases are dispersed finely and uniformly. Also, the addition of Ti minimizes the grain growth of the α-Fe phase.

Where V or Cr is added, any of these additive metal elements is coupled anti-ferromagnetically with Fe to form a solid solution, thus decreasing the magnetization significantly. The additive V or Cr cannot minimize the heat-treatment-induced grain growth sufficiently, either, and deteriorates the loop squareness of the demagnetization curve.

Accordingly, only when Ti is added, the grain coarsening of the α-Fe phase can be minimized appropriately and iron-based borides with ferromagnetic properties can be obtained. Furthermore, Ti, as well as B and C, plays an important role as an element that delays the crystallization of Fe initial crystals (i.e., γ-Fe that will be transformed into α-Fe) during the rapid cooling process and thereby facilitates the production of the supercooled liquid. Accordingly, even if the melt of the alloy including Ti is rapidly cooled and solidified at a relatively low cooling rate of about $10^{2\circ}$ C./s to about $10^{5\circ}$ C./s, a rapidly solidified alloy, in which the α-Fe phase has not precipitated too much and the microcrystalline $R_2Fe_{14}B$ and amorphous phases coexist, can be obtained. This greatly contributes to the cost reduction of nanocomposite magnets because this means that a strip casting process, particularly suitable for mass production, can be adopted as a rapid cooling technique.

The strip casting process is a highly productive and cost-effective method for obtaining a rapidly solidified alloy (or solidified alloy) by rapidly cooling a melt of a material alloy. This is because in the strip casting process, the flow rate of the melt does not have to be controlled using the nozzle or orifice but the melt may be poured directly from a tundish onto a chill roller. To amorphize the melt of an R—Fe—B rare earth alloy in a cooling rate range applicable to even the strip casting process, normally B (boron) should be added at 10 at % or more. In the prior art, however, if B is added that much, then not just amorphous phases but also an α-Fe phase and/or a soft magnetic $R_2Fe_{23}B_3$ phase will grow preferentially to have excessively large grain sizes when the rapidly solidified alloy is thermally treated. Then, no uniform, microcrystalline structure can be obtained. As a result, the volume percentage of ferromagnetic phases decreases, the magnetization drops and the volume percentage of the $R_2Fe_{14}B$ phase also decreases. Consequently, the coercivity decreases noticeably. However, if Ti is added as in preferred embodiments of the present invention, then the excessive grain growth of the α-Fe phase is minimized as described above. As a result, the magnetization increases more than expected.

It should be noted that a rapidly solidified alloy, including the $R_2Fe_{14}B$ phase at a high volume percentage, could improve the resultant magnetic properties more easily than a solidified alloy including the amorphous phases at a high volume percentage. Accordingly, the volume percentage of the $R_2Fe_{14}B$ phase to the overall solidified alloy is preferably about 50 volume % or more, more specifically about 60 volume % or more, which value was obtained by Mössbauer spectroscopy.

Preferred Composition

A nanocomposite magnet according to preferred embodiments of the present invention preferably has a composition represented by the general formula: $(Fe_{1-m}T_m)_{100-x-y-z-n}Q_xR_yTi_zM_n$, where T is at least one element selected from the group consisting of Co and Ni, Q is at least one element selected from the group consisting of B and C, R is at least one rare earth element that always includes at least one of Nd and Pr and optionally includes Dy and/or Tb, and M is at least one element selected from the group consisting of Al, Si, V, Cr, Mn, Cu, Zn, Ga, Zr, Nb, Mo, Ag, Hf, Ta, W, Pt, Au and Pb. The mole fractions x, y, z, m and n preferably satisfy the inequalities of 10 at %<x≦20 at %, 6 at %≦y<10 at %, 0.5 at %≦z≦12 at %, 0≦m≦0.5, and 0 at %≦n≦10 at %, respectively.

Q is either B (boron) only or a combination of B and C (carbon). The molar fraction of C to Q is preferably about 0.5 or less.

If the mole fraction x of Q is about 10 at % or less and if the rapid cooling rate is as low as about $10^{2\circ}$ C./s to about $10^{5\circ}$ C./s, then $H_{cJ}$ may be less than about 700 kA/m even when the resultant rapidly solidified alloy is thermally treated. In that case, it will be difficult to make a nanocomposite magnet with excellent magnetic properties by a melt spinning or strip casting process. In addition, the strip casting method, which is one of the most cost-effective techniques among various rapid cooling methods, cannot be adopted in that case, and the price of the resultant magnet rises unintentionally. On the other hand, if the mole fraction x of Q exceeds about 20 at %, then the volume percentage of the amorphous phases, remaining even in the alloy that has been heated and crystallized, increases. Meanwhile, the percentage of the α-Fe phase, which has a higher saturation magnetization than any other constituent phase, decreases and the remanence $B_r$ drops. In view of these considerations, the mole fraction x of Q is preferably greater than about 10 at % but about 20 at % or less, more preferably greater than about 10 at % but about 17 at % or less. Even more preferably, x is greater than about 10 at % but 14 at % or less, because the iron-based boride phase can be nucleated efficiently and $B_r$ can be increased in that range. It should be noted that if 15 at %<x≦20 at % where the amorphous phases are produced even more effectively, then the relationship 3.0 at %<z<12 at % is preferably satisfied.

The (atomic) ratio p of C to B and C is preferably about 0 to about 0.50. The reason is as follows. If Q essentially consists of B only, then a non-magnetic $TiB_2$ phase will precipitate to deteriorate the resultant magnetic properties or the viscosity of the molten alloy may increase excessively, thus making it difficult to quench the material alloy rapidly under desired conditions. To achieve the effects expected from the additive C, the C ratio p is preferably at least about 0.01. The reason is as follows. If p is much smaller than about 0.01, then almost no expected effects are achievable even if C is added. On the other hand, if p is far greater than about 0.5, then the volume percentage of the α-Fe phase produced increases too much, thereby interfering with the production of the $R_2Fe_{14}B$ phase and causing deterioration of the resultant magnetic properties. The lower limit of the ratio p is preferably about 0.02, while the upper limit thereof is preferably about 0.40. More preferably, the ratio p is about 0.08 to about 0.25.

R preferably includes Pr or Nd as an indispensable element, a portion of which may be replaced with Dy and/or Tb. Preferably, R includes substantially no La and substantially no Ce, because the presence of La or Ce decreases the coercivity and the loop squareness of the demagnetization curve. However, there is no problem of degrading the magnetic properties if very small amounts (i.e., about 0.5 at % or less) of La and Ce are included as inevitable impurities. Therefore, the term "substantially no La (Ce)" or "substantially excluding La (Ce)" means that the content of La (Ce) is about 0.5 at % or less.

If the mole fraction y of R is less than about 6 at %, then compound phases having the microcrystalline $R_2Fe_{14}B$ structure, which contribute to expressing the hard magnetic properties, do not crystallize sufficiently and a coercivity $H_{cJ}$ of at least about 480 kA/m cannot be obtained. On the other hand, if the mole fraction y of R is equal to or greater than about 10 at %, then the percentages of the iron-based borides and α-Fe with ferromagnetic properties both decrease. At the same time, the anticorrosiveness and oxidation resistance of the nanocomposite magnet powder also decrease. For these reasons, the mole fraction y of the rare earth element R is preferably about 6 at % to less than about 10 at % (e.g., about 7.0 at % to about 9.5 at %), more preferably about 7.0 at % to about 9.3 at %, and most preferably about 8.0 at % to about 9.0 at %.

To achieve the above-described effects, Ti is indispensable. The additive Ti increases the coercivity $H_{cJ}$, remanence $B_r$ and maximum energy product $(BH)_{max}$ and improves the loop squareness of the demagnetization curve.

If the mole fraction z of Ti is less than about 0.5 at %, then the above effects are not achieved fully even though Ti is added. Nevertheless, if the mole fraction z of Ti exceeds about 12 at %, then the non-magnetic $TiB_2$ phase will nucleate remarkably. In addition, since the volume percentage of the amorphous phases, remaining even in the alloy that has been heated and crystallized, increases and the remanence $B_r$ likely drops. In view of these considerations, the mole fraction z of Ti is preferably about 0.5 at % to about 12 at %. The lower limit of a more preferable z range is about 1.0 at % and the upper limit thereof is about 8.0 at %. The upper limit of an even more preferable z range is about 6.0 at %.

Also, the higher the total mole fraction x of B and/or C, the more likely the amorphous phases, including an excessive percentage of Q (e.g., boron), are formed. For that reason, the mole fraction z of Ti is preferably relatively high. Ti has a strong affinity for B and is condensed on the grain boundary of the hard magnetic phases. However, if the ratio of the Ti mole fraction z to the B mole fraction x is too high, then Ti will not be present on the grain boundary anymore but will be incorporated into the $R_2Fe_{14}B$ compound, thus possibly decreasing the magnetization. Nevertheless, if the z/x ratio is too low, then B-rich amorphous phases having low magnetization will be produced profusely. The present inventors confirmed via experiments that the mole fractions x and z are preferably controlled to satisfy the inequality of $0.05 \leq z/x \leq 0.4$, more preferably to satisfy the inequality of $0.1 \leq z/x \leq 0.35$ and even more preferably to satisfy the inequality of $0.13 \leq z/x \leq 0.3$.

The balance of the material alloy, other than the elements B, C, R and Ti, may be Fe alone. Alternatively, at least one transition metal element T, selected from the group consisting of Co and Ni, may be substituted for a portion of Fe, because the desired hard magnetic properties are achievable in that case also. However, if more than about 50% of Fe is replaced with T (i.e., m>0.5), then a high remanence $B_r$ of at least about 0.7 T cannot be obtained. For that reason, the percentage of Fe replaced is preferably from about 0% to about 50% (i.e., $0 \leq m \leq 0.5$). Also, by substituting Co for a portion of Fe, the hard magnetic properties such as $H_{cJ}$ and $B_r$ improve and the Curie temperature of the $R_2Fe_{14}B$ phase increases, thus increasing the thermal resistance of the alloy. The percentage of Fe that is replaceable with Co is preferably about 0.5% to about 40%.

The material alloy may also include, as an additive M, at least one element selected from the group consisting of Al, Si, V, Cr, Mn, Cu, Zn, Ga, Zr, Nb, Mo, Ag, Hf, Ta, W, Pt, Au and Pb at a small volume percentage. The magnetic properties do not deteriorate as long as the mole fraction n of the element(s) is about 10 at % or less. However, the mole fraction n is preferably about 2 at % or less.

Hereinafter, preferred embodiments of a method of making a nanocomposite magnet (or a material alloy for a nanocomposite magnet) according to the present invention, in which a melt spinning process or a strip casting process (i.e., exemplary roller processes) is carried out, will be described.

Melt Quenching Machine

Figure 5A:
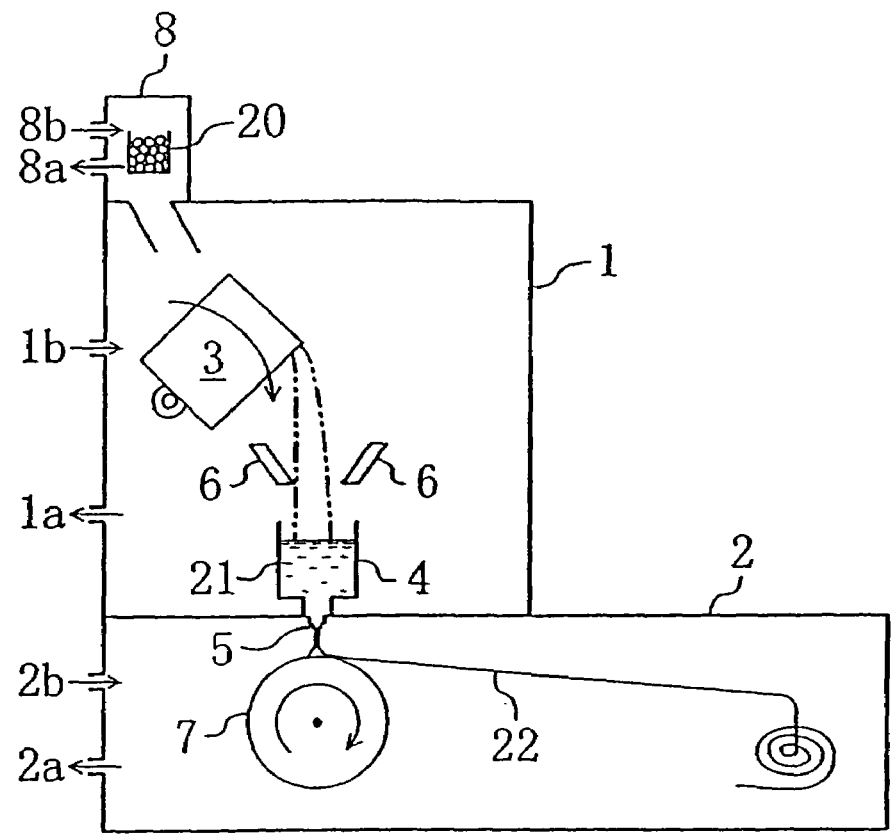
FIG. 5A is a cross-sectional view illustrating an overall arrangement of a melt quenching machine for use to make a rapidly solidified alloy as a material alloy for the nanocomposite magnet of various preferred embodiments of the present invention.
Figure 5B:
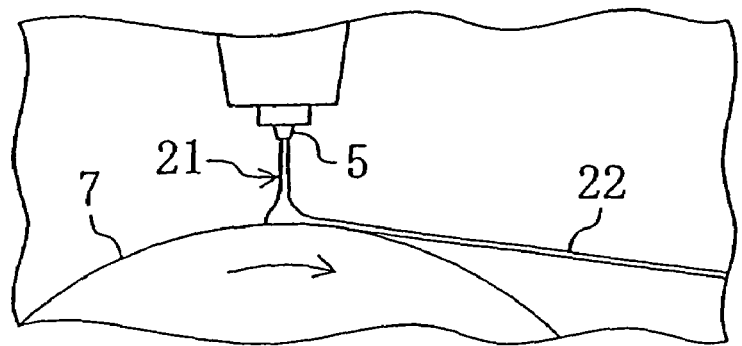
FIG. 5B illustrates a portion of the machine shown in FIG. 5A, where a melt is quenched and rapidly solidified, on a larger scale.

In this preferred embodiment, a rapidly solidified alloy is prepared by using a melt quenching machine such as that shown in FIGS. 5A and 5B. The alloy preparation process is performed within an inert atmosphere to prevent the rapidly solidified alloy, which includes rare earth element R and Fe that are easily oxidizable, from being oxidized. The inert gas may be either a rare gas of helium or argon, for example, or nitrogen. The rare gas of helium or argon is preferred to nitrogen, because nitrogen reacts with the rare earth element R relatively easily.

The machine shown in FIG. 5A includes material alloy melting and quenching chambers 1 and 2, in which a vacuum or an inert atmosphere is created at an adjustable pressure. Specifically, FIG. 5A illustrates an overall arrangement of the machine, while FIG. 5B illustrates a portion of the machine on a larger scale.

As shown in FIG. 5A, the melting chamber 1 includes a melt crucible 3, a reservoir 4 with a teeming nozzle 5 at the bottom, and an airtight mixed material feeder 8. A material alloy 20, which has been mixed to have a desired magnet alloy composition and supplied from the feeder 8, is melted in the melt crucible 3 at an elevated temperature. A melt 21 of the material alloy 20 is poured into the reservoir 4, which is provided with a heater (not shown) for keeping the temperature of the melt teemed therefrom at a predetermined level.

The quenching chamber 2 includes a rotating chill roller 7 for rapidly cooling and solidifying the melt 21 that has been dripped through the teeming nozzle 5.

In this machine, the atmosphere and pressure inside the melting and quenching chambers 1 and 2 are controllable within prescribed ranges. For that purpose, atmospheric gas inlet ports 1b, 2b and 8b and outlet ports 1a, 2a and 8a are provided at appropriate positions of the machine. In particular, the gas outlet port 2a is connected to a pump to control the absolute pressure inside the quenching chamber 2 within a range from about 30 kPa to approximately atmospheric pressure.

The melt crucible 3 may define a desired tilt angle to pour the melt 21 through a funnel 6 into the reservoir 4. The melt 21 is heated in the reservoir 4 by the heater (not shown).

The teeming nozzle 5 of the reservoir 4 is positioned on the boundary wall between the melting and quenching chambers 1 and 2 to drip the melt 21 in the reservoir 4 onto the surface of the chill roller 7, which is located under the nozzle 5. The orifice diameter of the nozzle 5 may be about 0.5 mm to about 2.0 mm, for example. If the viscosity of the melt 21 is high, then the melt 21 cannot flow through the nozzle 5 easily. In this preferred embodiment, however, the pressure inside the quenching chamber 2 is kept lower than the pressure inside the melting chamber 1. Accordingly, an appropriate pressure difference is made between the melting and quenching chambers 1 and 2, and the melt 21 can be teemed smoothly.

To achieve a good thermal conductivity, the chill roller 7 may be made of Al alloy, Cu alloy, carbon steel, brass, W, Mo or bronze. However, the roller 7 is preferably made of Cu, Fe or an alloy including Cu or Fe, because such a material realizes a sufficient mechanical strength at a reasonable cost. Also, if the chill roller 7 is made of a material other than Cu or Fe, the resultant rapidly solidified alloy cannot be peeled off the chill roller 7 easily and might be wound around the chill roller 7. The diameter of the roller 7 may be about 300 mm to about 500 mm, for instance. The water-cooling capability of a water cooler provided inside the roller 7 is calculated and adjustable based on the latent heat of solidification and the volume of the melt teemed per unit time.

The machine shown in FIGS. 5A and 5B can rapidly solidify 10 kg of material alloy in 10 to 20 minutes, for example. The alloy solidified in this manner is preferably in the form of a thin strip (or ribbon) 22 with a thickness of about 10 µm to about 300 µm and a width of about 2 mm to about 3 mm.

Figure 6:
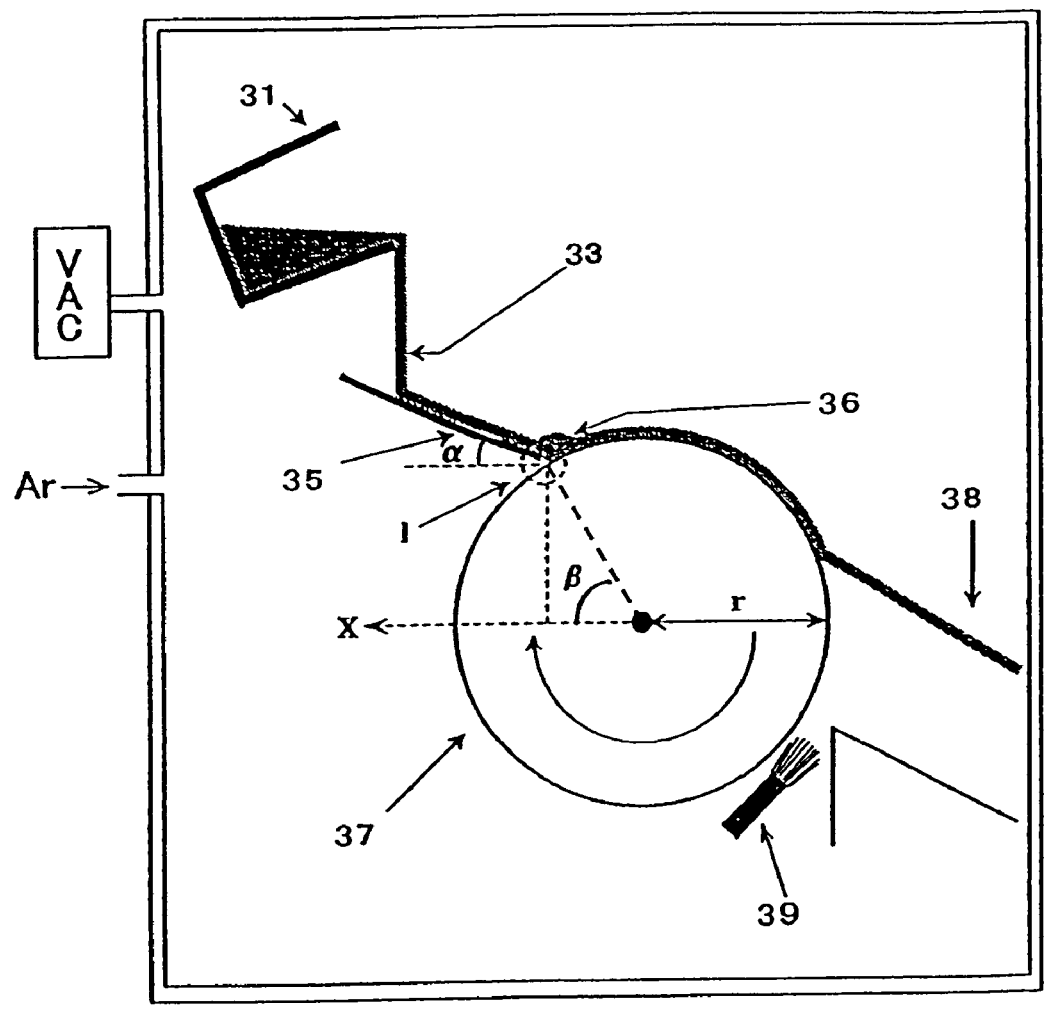
FIG. 6 is a cross-sectional view illustrating another exemplary machine for use to make a rapidly solidified alloy as a material alloy for the nanocomposite magnet of various preferred embodiments of the present invention.

The rapidly solidified alloy may also be prepared by using a strip caster such as that shown in FIG. 6.

The strip caster shown in FIG. 6 is disposed in a chamber in which a reduced-pressure inert atmosphere can be created. Just like the machine shown in FIG. 5A, the strip caster preferably includes a melt crucible 31, a chill roller 37, a shoot (or tundish) 35, and scraper gas spray 39. First, a material alloy is melted in the melt crucible 31. Next, the melt 33 is drained from the melt crucible 31 and then guided by way of the shoot 35 onto the chill roller 37 so as to be rapidly cooled and solidified thereon. The melt 33, which has been rapidly solidified on the chill roller 37, then leaves the roller 37 as a thin-strip rapidly solidified alloy 38 as the roller 37 rotates. The scraper gas spray 39 is provided to make the thin-strip rapidly solidified alloy 38 easily peelable from the chill roller 37.

The melt crucible 31 is constructed to feed the melt 33, prepared by melting the material alloy, onto the shoot 35 at a substantially constant feeding rate. This feeding rate is arbitrarily controllable by tilting the melt crucible 31 at a desired angle, for example. In the preferred embodiment illustrated in FIG. 6, the melt 33 is directly poured from the melt crucible 31 onto the shoot 35. Alternatively, the melt 33 may also be poured onto the shoot 35 by way of a downspout, which may be provided between the melt crucible 31 and the shoot 35.

The outer circumference of the chill roller 37 is preferably made of a material having relatively good thermal conductivity (e.g., copper). The roller 37 preferably has a diameter (2r) of about 30 cm to about 100 cm and a width of about 15 cm to about 100 cm. The roller 37 can be rotated at a predetermined velocity by a motor (not shown). By controlling this rotational velocity, the surface velocity of the chill roller 37 is arbitrarily adjustable. The cooling rate achieved by this strip caster is controllable within a range of from about $1 \times 10^{2\circ}$ C./s to about $1 \times 10^{5\circ}$ C./s by selecting an appropriate rotational velocity for the chill roller 37, for example.

The surface of the shoot 35 on which the melt 33 is guided forms a tilt angle α with respect to the horizontal plane X. The distance between the far end of the shoot 35 and the surface of the chill roller 37 is preferably within about several millimeters or less. Also, the shoot 35 is arranged such that the line connecting the far end of the shoot 35 to the center of the chill roller 37 forms an angle β (where $0 \leq \beta \leq 90$ degrees) with respect to the horizontal plane X. The tilt angle α of the shoot 35 is preferably between about 1 and about 80 degrees, more preferably between about 5 and about 60 degrees. The angle β is preferably between about 10 and about 55 degrees.

After having been poured onto the shoot 35, the melt 33 will be teemed from the far end of the shoot 35 onto the surface of the chill roller 37 substantially without receiving any pressure, thereby forming a melt puddle 36 thereon.

The shoot 35 (made of a ceramic, for example) can rectify the flow of the melt 33 by delaying the flow velocity of the melt 33 to such a degree as to temporarily reserve the flow of the melt 33 that is being continuously fed from the melt crucible 31 at a predetermined flow rate. This rectification effect can be further increased with a dam plate for selectively damming back the surface flow of the melt 33 that has been poured onto the shoot 35.

By using this shoot 35, the melt 33 can be teemed so as to have a substantially constant width in the longitudinal direction of the chill roller 37. As used herein, the "longitudinal direction" of the chill roller 37 is equivalent to the axial direction of the roller 37 (i.e., the direction coming out of the paper). Also, the melt 33 being teemed can be spread so as to have a substantially uniform thickness. If the melt guide surface of the shoot 35 has its tilt angle α adjusted, the melt feeding rate is finely controllable. Due to its own weight, the melt 33 flows down the tilted guide surface of the shoot 35. Accordingly, the melt 33 has a kinetic momentum that is substantially parallel to the horizontal (i.e., X-axis) direction. That is to say, the larger the tilt angle α of the shoot 35, the higher the flow velocity of the melt 33 and the greater the momentum thereof.

Melt Quenching Process

First, the melt 21 of the material alloy, which is represented by the general formula described above, is prepared and stored in the reservoir 4 of the melting chamber 1 shown in FIG. 5A. The oxygen content of the resultant nanocomposite magnet heavily depends on the atmosphere in this alloy preparation process. Accordingly, to prevent the melt 21 from having an excessive oxygen content, the atmosphere inside the melt crucible 3 is once evacuated to a high vacuum and then replaced with Ar gas, for example. In the strip casting process, a melt having a high temperature and high chemical activity flows along the shoot as described above. Accordingly, the melt contacts with the atmospheric gas inside the chamber for a long time, and easily reacts with oxygen or nitrogen. If the nanocomposite magnet may have an oxygen content of about 200 ppm to about 1,500 ppm, then the melt crucible 3 for use to prepare the molten alloy may reach a vacuum of at most about $10^{-1}$ Pa. As a result, the equipment cost, and eventually the manufacturing cost as well, can be reduced significantly. Even when the material alloy is prepared by a strip casting process using the strip caster shown in FIG. 6, similar effects are also achievable. It should be noted that to reduce the oxygen content of the nanocomposite magnet to less than about 200 ppm, the highest vacuum is preferably no greater than about $10^{-2}$ Pa. Next, the melt 21 is dripped through the teeming nozzle 5 onto the water-cooled chill roller 7 to contact with, and be rapidly cooled and solidified by, the roller 7 within a low-pressure Ar atmosphere. In this case, an appropriate rapid solidification technique, making the cooling rate controllable precisely, should be adopted.

In this preferred embodiment, the melt 21 is preferably cooled and solidified at a rate of about $1 \times 10^{2}$° C./s to about $1 \times 10^{8}$° C./s, more preferably about $1 \times 10^{4}$° C./S to about $1 \times 10^{6}$° C./s. The resultant alloy ribbon preferably has a thickness of about 50 μm to about 200 μm and a width of about 5 mm to about 30 mm.

An interval during which the melt 21 is quenched by the chill roller 7 is equivalent to an interval between a point in time the alloy contacts with the outer circumference of the rotating chill roller 7 and a point in time the alloy leaves the roller 7. In the meantime, the alloy has its temperature decreased to be a supercooled liquid. Thereafter, the supercooled alloy leaves the roller 7 and travels within the inert atmosphere. While the thin-strip alloy is traveling, the alloy has its heat dissipated into the atmospheric gas. As a result, the temperature of the alloy further drops. In this preferred embodiment, the pressure of the atmospheric gas is about 30 kPa to the atmospheric pressure. Thus, the heat of the alloy can be dissipated into the atmospheric gas even more effectively, and the $Nd_2Fe_{14}B$ phase can nucleate and grow finely and uniformly in the alloy. It should be noted that unless an appropriate amount of Ti has been added to the material alloy, then the α-Fe phase nucleates and grows faster and earlier in the rapidly solidified alloy, thus deteriorating the resultant magnetic properties.

In this preferred embodiment, the surface velocity of the roller 7 is adjusted to fall within the range of about 10 m/s to about 30 m/s and the pressure of the atmospheric gas is set to about 30 kPa or more to improve the secondary cooling effects caused by the atmospheric gas. In this manner, a rapidly solidified alloy, including about 60 volume % or more of $R_2Fe_{14}B$ phase with an average grain size of as small as about 80 nm or less, is prepared.

In one preferred embodiment of the present invention described above, a melt spinning process, in which the flow rate of the molten alloy to be supplied onto the surface of the chill roller is controlled by using the nozzle or orifice, is adopted as an exemplary melt quenching process to make the nanocomposite magnet of preferred embodiments of the present invention. In another preferred embodiment described above, a strip casting process is carried out for the same purpose by using a strip caster, including no nozzle or orifice, as shown in FIG. 6. However, any of various other melt quenching processes may also be carried out to prepare the material alloy. For example, the single roller method described above may be replaced with a twin roller method that uses a pair of chill rollers. Alternatively, an atomization process such as a gas atomization process may be used. As another alternative, a cooling process may also be a combination of a roller method and an atomization method.

Among these rapid cooling techniques, the strip casting method results in a relatively low cooling rate, i.e., about $10^{2}$° C./s to about $10^{5}$° C./s. According to this preferred embodiment, by adding an appropriate volume of Ti to the material alloy, a rapidly solidified alloy, most of which has a structure including no Fe initial crystals, can be obtained even by the strip casting process. The process cost of the strip casting method can be about half or less of any other rapid cooling method. Accordingly, to prepare a large quantity of rapidly solidified alloy, the strip casting method is much more effective than the melt spinning method, and is suitably applicable to mass production. However, if no Ti is added to the material alloy or if Cr, V, Mn, Mo, Ta and/or W are/is added thereto instead of Ti, then a metal structure including a lot of Fe initial crystals will be produced even in the rapidly solidified alloy prepared by the strip casting process. Consequently, the desired metal structure cannot be obtained.

Also, in the melt spinning or strip casting process, the thickness of the resultant alloy is controllable by adjusting the surface velocity of the chill roller. If an alloy having a thickness of about 60 μm to about 300 μm is prepared by adjusting the surface velocity of the chill roller, then the alloy has the nanocrystalline structure described above, and can be easily divided into powder particles having various orientations through a pulverization process. As a result, powder particles having an isometric shape (i.e., having an aspect ratio close to one) can be obtained easily. That is to say, the powder particles obtained will not be elongated in a particular orientation but will have an isometric (or quasi-spherical) shape. More specifically, magnet powder particles having an aspect ratio of about 0.3 to about 1.0 can be obtained. As used herein, the "aspect ratio" of powder particles means a ratio of the minor-axis size of the particles to the major-axis size thereof. A compound for a bonded magnet, made from a magnet powder having such an aspect ratio, can exhibit excellent moldability and flowability.

Heat Treatment

In this preferred embodiment, the rapidly solidified alloy is thermally treated within an argon atmosphere. Preferably, the alloy is heated at a temperature rise rate of about 0.08° C./s to about 20° C./s, retained at a temperature of about 550° C. to about 850° C. for about 30 seconds to about 20 minutes and then cooled to room temperature. This heat treatment results in nucleation and/or crystal growth of metastable phases in a remaining amorphous phase, thus forming a nanocomposite microcrystalline structure. According to this preferred embodiment, the microcrystalline $R_2Fe_{14}B$ phase already accounts for about 60 volume % or more of the as-cast alloy that is yet to be thermally treated. Thus, when the alloy is thermally treated, $\alpha$-Fe and other crystalline phases will not increase their sizes too much and the respective constituent phases other than the $R_2Fe_{14}B$ phase (i.e., soft magnetic phases) will be dispersed finely and uniformly.

If the heat treatment temperature is lower than about 550° C., then a lot of amorphous phases may remain even after the heat treatment and the resultant coercivity may not reach the desired level depending on the conditions of the rapid cooling process. On the other hand, if the heat treatment temperature exceeds about 850° C., the grain growth of the respective constituent phases will advance too much, thus decreasing the remanence $B_r$ and deteriorating the loop squareness of the demagnetization curve. For these reasons, the heat treatment temperature is preferably about 550° C. to about 850° C., more preferably about 570° C. to about 820° C.

In this preferred embodiment, the atmospheric gas causes the secondary cooling effects so that a sufficient amount of $R_2Fe_{14}B$ phase crystallizes uniformly and finely in the rapidly solidified alloy. Accordingly, even if the rapidly solidified alloy is not heat-treated, the solidified alloy itself can exhibit sufficient magnetic properties. That is to say, the heat treatment for crystallization is not an indispensable process in the present invention. However, to further improve the magnetic properties, the heat treatment is preferably conducted. In addition, even though the heat treatment is carried out at lower temperatures than the conventional process, the magnetic properties still can be improved sufficiently.

To prevent the alloy from being oxidized, the heat treatment is preferably conducted within an inert atmosphere. The heat treatment may also be performed within a vacuum of about 0.1 kPa or less. Also, by defining the heat treatment conditions such that the resultant nanocomposite magnet will have a nitrogen content of about 400 ppm or less, the degradation of magnetic properties can be minimized to a negligible degree in practice even if the alloy is thermally treated within a nitrogen atmosphere. In that case, a rare gas of argon, for example, may be replaced with an inexpensive nitrogen gas.

It should be noted that if carbon is added to the material alloy, the oxidation resistance of the magnet powder can be further increased. If a sufficient amount of C has been added to the material alloy, then the rapidly solidified alloy may be heat-treated in the air.

The rapidly solidified alloy yet to be heat-treated may include metastable phases such as $Fe_3B$, $Fe_{23}B_6$, and $R_2Fe_{23}B_3$ phases in addition to the $R_2Fe_{14}B$ and amorphous phases. In that case, when the heat treatment is finished, the $R_2Fe_{23}B_3$ phase will have disappeared due to the action of the additive Ti. Instead, crystal grains of an iron-based boride (e.g., $Fe_{23}B_6$), exhibiting a saturation magnetization that is equal to, or even higher than, that of $R_2Fe_{14}B$ phase, or $\alpha$-Fe phase can be grown.

Even if the nanocomposite magnet of preferred embodiments of the present invention includes the soft magnetic phases such as the $\alpha$-Fe phase, the grain growth of the soft magnetic phases has been minimized by the additive Ti and the magnet has the desired nanocrystalline structure. Accordingly, the soft and hard magnetic phases are magnetically coupled together through exchange interactions and the magnet can exhibit excellent magnetic properties.

After the heat treatment, the $R_2Fe_{14}B$ phase (i.e., a hard magnetic phase) needs to have an average crystal grain size of less than about 300 nm, which is a single magnetic domain size. The $R_2Fe_{14}B$ phase preferably has an average grain size of about 5 nm to about 200 nm, more preferably about 20 nm to about 150 nm and even more preferably about 20 nm to about 100 nm. On the other hand, if the boride and $\alpha$-Fe phases (i.e., soft magnetic phases) have an average crystal grain size of more than about 50 nm, then the exchange interactions among the soft and hard phases weaken, thus deteriorating the loop squareness of the demagnetization curve and decreasing $(BH)_{max}$. Nevertheless, if the average crystal grain size of those soft magnetic phases is less than about 1 nm, then a high coercivity cannot be achieved. For these reasons, the soft magnetic phases, such as the boride and $\alpha$-Fe phases, preferably have an average crystal grain size of about 1 nm to about 50 nm, more preferably about 50 nm or less, and even more preferably about 30 nm or less. To achieve good magnetic properties, the average grain sizes of the hard and soft magnetic phases preferably fall within the ranges specified above, and the average grain size of the hard magnetic phases is preferably greater than that of the soft magnetic phases.

It should be noted that the thin strip of the rapidly solidified alloy may be coarsely cut or pulverized before subjected to the heat treatment.

After being heat-treated, the resultant magnetic alloy is finely pulverized to obtain a magnet powder. Then, various types of bonded magnets can be made from this powder by performing known process steps on this powder. In making a bonded magnet, the magnet powder of the iron-based rare earth alloy is compounded with an epoxy or nylon resin binder and then molded into a desired shape. At this time, a magnet powder of any other type (e.g., an Sm—Fe—N magnet powder or hard ferrite magnet powder) may be mixed with the nanocomposite magnet powder.

Using the resultant bonded magnet, motors, actuators and other rotating machines and various apparatuses can be produced.

When the magnet powder of preferred embodiments of the present invention is used to make an injection-molded bonded magnet, the powder is preferably pulverized to a mean particle size of about 200 μm or less, more preferably about 30 μm to about 150 μm. On the other hand, where the magnet powder of preferred embodiments of the present invention is used to make a compacted bonded magnet, the powder is preferably pulverized to a mean particle size of about 300 μm or less, more preferably about 30 μm to about 250 μm, and even more preferably about 50 μm to about 200 μm with a bimodal size distribution.

It should be noted that if the powder obtained is subjected to a surface treatment (e.g., coupling treatment, conversion coating or plating), then the powder used to make a bonded magnet can have increased moldability no matter how the powder is molded. In addition, the resultant bonded magnet can have increased anticorrosiveness and thermal resistance. Alternatively, after a bonded magnet has been once formed by molding the powder into a desired shape, the surface of the magnet may also be treated, e.g., covered with a plastic or conversion coating or plated. This is because anticorrosiveness and thermal resistance of the bonded magnet can also be increased as much as the surface-treated powder.

EXAMPLES

Examples 1 to 7

A material, which had been mixed to have an alloy composition including about 8.5 at % of Nd, about 11.5 at % of B, about 0.5 at % of C, about 2.5 at % of Ti and Fe as the balance and a weight of about 5 kg, was introduced into a crucible and then inductively heated within an Ar atmosphere having a pressure maintained at about 50 kPa, thereby obtaining a material alloy. In this case, the oxygen partial pressure inside the melting chamber of the inductive heater was changed to prepare seven types of material alloys having various oxygen contents. Nanocomposite magnets having the respective oxygen contents shown in Table 1 were obtained as Examples Nos. 1 through 7 from these material alloys.

A rapidly solidified alloy was made from each of the material alloys by a strip casting process. More specifically, the crucible was tilted to feed the melt of the material alloy onto a copper chill roller, having a diameter of about 250 mm and rotating at a surface velocity of about 15 m/s, by way of a shoot, thereby rapidly cooling and solidifying the material alloy. In this process step, the melt feeding rate was controlled to about 2 kg/min by adjusting the tilt angle of the crucible. The resultant rapidly solidified alloy had an average thickness of about 80 μm with a standard deviation a of about 10 μm.

Thereafter, the strip cast alloy that had been obtained in this manner was pulverized to a size of about 850 μm or less and then was fed at a rate of about 20 g/min into a hoop belt furnace, running at a speed of about 100 mm/min, within an argon atmosphere that had a temperature maintained at about 700° C. In this manner, the powder was thermally treated to obtain a magnet powder.

The constituent phases of the magnet powder were identified by a powder XRD analysis. As a result, the magnet powder turned out to be a nanocomposite magnet powder including an $Nd_2Fe_{14}B$ phase and an $Fe_{23}B_6$ phase. The magnetic properties of the magnet powder, which were measured at room temperature with a vibrating sample magnetometer, are also shown in Table 1. Each of the nanocomposite magnet powders had a nitrogen content of about 20 ppm or less.

In all of the following specific examples of preferred embodiments of the present invention and comparative examples, the oxygen content of each nanocomposite magnet was measured on a magnet powder that had just been obtained by pulverizing the rapidly solidified alloy, while the nitrogen content thereof was measured on a magnet powder that had been thermally treated. The present inventors confirmed via experiments that the oxygen contents of magnet powders were substantially unchanged before and after the heat treatment process. The oxygen and nitrogen contents of the nanocomposite magnets were measured with EMGA-550 produced by Horiba, Ltd.

Comparative Examples 1 to 3

A material, which had been mixed to have an alloy composition including about 8.5 at % of Nd, about 11.5 at % of B, about 0.5 at % of C, about 2.5 at % of Ti and Fe as the balance and a weight of about 5 kg, was introduced into a crucible and then inductively heated within an Ar atmosphere having a pressure maintained at about 50 kPa, thereby obtaining a material alloy. In this case, the oxygen partial pressure inside the melting chamber was changed as in Examples Nos. 1 through 7 described above to prepare three types of material alloys having various oxygen contents. Nanocomposite magnets having the respective oxygen contents shown in Table 1 were obtained as Comparative Examples Nos. 1 through 3 from these material alloys.

A rapidly solidified alloy was made from each of the material alloys by a strip casting process. More specifically, the crucible was tilted to feed the melt of the material alloy onto a copper chill roller, having a diameter of about 250 mm and rotating at a surface velocity of about 15 m/s, by way of a shoot, thereby rapidly cooling and solidifying the molten alloy. In this process step, the melt feeding rate was controlled to about 2 kg/min by adjusting the tilt angle of the crucible. The resultant rapidly solidified alloy had an average thickness of about 80 μm with a standard deviation σ of about 10 μm.

Thereafter, the strip cast alloy that had been obtained in this manner was pulverized to a size of about 850 μm or less and then was fed at a rate of about 20 g/min into a hoop belt furnace, running at a speed of about 100 mm/min, within an argon atmosphere that had a temperature retained at about 700° C. In this manner, the powder was thermally treated to obtain a magnet powder.

The constituent phases of the magnet powder were identified by a powder XRD analysis. As a result, the magnet powder turned out to be a nanocomposite magnet powder including an $Nd_2Fe_{14}B$ phase and an $Fe_{23}B_6$ phase. The magnetic properties of the magnet powder, which were measured at room temperature with a vibrating sample magnetometer, are also shown in Table 1. Each of the nanocomposite magnets had a nitrogen content of about 20 ppm or less as in the examples of preferred embodiments of the present invention described above.

TABLE 1

|  | $O_2$ content (ppm) | $B_r$ (T) | $H_{cJ}$ (kA/m) | $(BH)_{max}$ (kJ/m³) |
|---|---|---|---|---|
| EXAMPLE | | | | |
| 1 | 53 | 0.912 | 740.1 | 128.2 |
| 2 | 105 | 0.909 | 738.9 | 126.5 |
| 3 | 210 | 0.904 | 725.1 | 122.8 |
| 4 | 340 | 0.901 | 733.4 | 118.8 |
| 5 | 630 | 0.883 | 721.9 | 111.5 |
| 6 | 870 | 0.841 | 703.9 | 102.7 |
| 7 | 1,320 | 0.741 | 588.3 | 82.4 |
| CMP | | | | |
| 1 | 1,530 | 0.521 | 381.9 | 33.2 |
| 2 | 1,710 | 0.329 | 228.4 | 20.1 |
| 3 | 2,030 | 0.211 | 103.6 | 6.3 |

As can be seen from the results shown in Table 1, the nanocomposite magnets of Examples Nos. 1 through 7, having oxygen contents of less than about 1,500 ppm by mass, exhibited hard magnetic properties including a remanence $B_r$ of at least about 0.7 T and a coercivity $H_{cJ}$ of at least about 480 kA/m, which reached the levels required by various types of rotating machines and actuators. Furthermore, the nanocomposite magnets of Examples Nos. 3 through 5, having oxygen contents of about 200 ppm to about 700 ppm, exhibited magnetic properties (e.g., $B_r$) that were comparable to those of the nanocomposite magnets of Examples Nos. 1 and 2 having oxygen contents of about 50 ppm to about 100 ppm.

Examples 8 to 14

A material, which had been mixed to have an alloy composition including about 8.5 at % of Nd, about 11.5 at % of B, about 0.5 at % of C, about 2.5 at % of Ti and Fe as the balance and a weight of about 5 kg, was introduced into a crucible and then inductively heated within an Ar atmosphere having a pressure retained at about 50 kPa, thereby obtaining a material alloy.

A rapidly solidified alloy was made from each of the material alloys by a strip casting process. More specifically, the crucible was tilted to feed the melt of the material alloy onto a copper chill roller, having a diameter of about 250 mm and rotating at a surface velocity of about 15 m/s, by way of a shoot, thereby rapidly cooling and solidifying the material alloy. In this process step, the melt feeding rate was controlled to about 2 kg/min by adjusting the tilt angle of the crucible. The resultant rapidly solidified alloy had an average thickness of about 80 µm with a standard deviation σ of about 10 µm.

Thereafter, the strip cast alloy that had been obtained in this manner was pulverized to a size of about 850 µm or less and then was retained at about 700° C. for approximately one hour within a vacuum heating furnace having a nitrogen atmosphere inside. In this manner, a magnet powder was obtained. In this process step, the pressure of the nitrogen gas inside the vacuum heating furnace was changed to prepare seven types of magnet powders as Examples Nos. 8 through 14 having the respective nitrogen contents shown in Table 2. The oxygen contents of the powders were controlled to about 700 ppm or less.

The constituent phases of the magnet powder were identified by a powder XRD analysis. As a result, the magnet powder turned out to be a nanocomposite magnet powder including an $Nd_2Fe_{14}B$ phase and an $Fe_{23}B_6$ phase. The magnetic properties of the magnet powder, which were measured at room temperature with a vibrating sample magnetometer, are also shown in Table 2.

Comparative Examples 4 and 5

A material, which had been mixed to have an alloy composition including about 8.5 at % of Nd, about 11.5 at % of B, about 0.5 at % of C, about 2.5 at % of Ti and Fe as the balance and a weight of about 5 kg, was introduced into a crucible and then inductively heated within an Ar atmosphere having a pressure retained at about 50 kPa, thereby obtaining a material alloy.

A rapidly solidified alloy was made from each of the material alloys by a strip casting process. More specifically, the crucible was tilted to feed the melt of the material alloy onto a copper chill roller, having a diameter of about 250 mm and rotating at a surface velocity of about 15 m/s, by way of a shoot, thereby rapidly cooling and solidifying the molten alloy. In this process step, the melt feeding rate was controlled to about 2 kg/min by adjusting the tilt angle of the crucible. The resultant rapidly solidified alloy had an average thickness of about 80 µm with a standard deviation σ of about 10 µm.

Thereafter, the strip cast alloy that had been obtained in this manner was pulverized to a size of about 850 µm or less and then was retained at about 700° C. for approximately one hour within a vacuum heating furnace having a nitrogen atmosphere inside. In this manner, a magnet powder was obtained. In this process step, the pressure of the nitrogen gas inside the vacuum heating furnace was changed to prepare two types of magnet powders as Comparative Examples Nos. 4 and 5 having the respective nitrogen contents shown in Table 2. The oxygen contents of the powders were controlled to be about 700 ppm or less.

The constituent phases of the magnet powder were identified by a powder XRD analysis. As a result, the magnet powder turned out to be a nanocomposite magnet powder including an $Nd_2Fe_{14}B$ phase and an $Fe_{23}B_6$ phase. The magnetic properties of the magnet powder, which were measured at room temperature with a vibrating sample magnetometer, are also shown in Table 2.

TABLE 2

| | N content (ppm) | $B_r$ (T) | $H_{cJ}$ (kA/m) | $(BH)_{max}$ (kJ/m$^3$) |
|---|---|---|---|---|
| EXAMPLE | | | | |
| 8 | 10 | 0.909 | 740.4 | 124.3 |
| 9 | 20 | 0.912 | 734.2 | 127.4 |
| 10 | 67 | 0.905 | 720.1 | 123.8 |
| 11 | 128 | 0.899 | 714.4 | 120.3 |
| 12 | 154 | 0.883 | 703.9 | 115.5 |
| 13 | 220 | 0.871 | 682.5 | 111.4 |
| 14 | 348 | 0.854 | 685.8 | 98.8 |
| CMP | | | | |
| 4 | 421 | 0.782 | 568.4 | 85.7 |
| 5 | 476 | 0.748 | 540.5 | 73.2 |

As can be seen from the results shown in Table 2, the nanocomposite magnets of Examples Nos. 8 through 14, having nitrogen contents of less than 400 ppm, exhibited hard magnetic properties including a remanence $B_r$ of at least about 0.8 T and a coercivity $H_{cJ}$ of at least about 600 kA/m. Thus, it can be seen that as long as the oxygen content is controlled to about 700 ppm or less and the nitrogen content is adjusted to about 400 ppm or less by controlling the heat treatment conditions, excellent magnetic properties are also achievable even by conducting a heat treatment within a nitrogen atmosphere. Even if the oxygen content exceeds about 700 ppm, the oxygen content has only to be less than about 1,500 ppm. This is because the degradation of magnetic properties can be reduced to a negligible level and a nanocomposite magnet having sufficient magnetic properties still can be obtained even when the heat treatment is conducted within a nitrogen atmosphere.

As described above, by controlling the oxygen and nitrogen contents of the nanocomposite magnet to about 1,500 ppm or less and about 400 ppm or less, respectively, excellent magnetic properties, including a remanence $B_r$ of at least about 0.8 T and a coercivity $H_{cJ}$ of at least about 550 kA/m, are achievable. However, it is not only when the oxygen content is about 1,500 ppm or less that a nitrogen content of more than about 400 ppm degrades the magnetic properties significantly. It should also be noted that the cost of a heat treatment process can be reduced advantageously by conducting the heat treatment within a nitrogen atmosphere, not a rare gas atmosphere, irrespective of the magnetic property (or oxygen content) of the nanocomposite magnet.

Various preferred embodiments of the present invention described above provide a nanocomposite magnet exhibiting excellent magnetic properties including a high coercivity $H_{cJ}$ of at least about 480 kA/m and a remanence $B_r$ of at least about 0.7 T.

Also, according to preferred embodiments of the present invention, even if a rapidly solidified alloy is prepared by a melt quenching process at a decreased cooling rate, the additive Ti minimizes the precipitation of the α-Fe phase during the melt quenching process. Therefore, a strip casting process, or a melt quenching process resulting in a relatively low cooling rate and suitably applicable to mass production, can be adopted, thus reducing the manufacturing cost advantageously.

Furthermore, according to preferred embodiments of the present invention, even if a rapidly solidified alloy, prepared by a melt quenching process, is thermally treated within a nitrogen atmosphere, a nanocomposite magnet having sufficient magnetic properties still can be obtained. Thus, the manufacturing cost of nanocomposite magnets can be further reduced.

It should be understood that the foregoing description of preferred embodiments is only illustrative of the present invention. Various alternatives and modifications can be devised by those skilled in the art without departing from the present invention. Accordingly, the present invention is intended to embrace all such alternatives, modifications and variances which fall within the scope of the appended claims.

The invention claimed is:

1. A nanocomposite magnet having a composition represented by the general formula: $(Fe_{1-m}T_m)_{100-x-y-z-n}Q_xR_yTi_zM_n$, where T is at least one element selected from the group consisting of Co and Ni; Q is at least one element selected from the group consisting of B and C; R is at least one rare earth element that always includes at least one of Nd and Pr and optionally includes Dy and/or Tb, wherein R includes La only in an amount due to inevitable impurities; and M is at least one element selected from the group consisting of Al, Si, V, Cr, Mn, Cu, Zn, Ga, Zr, Nb, Mo, Ag, Hf, Ta, W, Pt, Au and Pb, the mole fractions x, y, z, m and n satisfying the inequalities of:

10 at %<x≦20 at %;
6 at %≦y<10 at %;
0.5 at %≦z≦12 at %;
0≦m≦0.5; and
0 at %≦n≦10 at %, respectively, wherein the nanocomposite magnet:

has an oxygen content of about 20 ppm to about 1,500 ppm by mass;

has a nitrogen content of about 10 ppm to about 400 ppm by mass;

comprises at least two ferromagnetic crystalline phases including a hard magnetic phase including an $R_2Fe_{14}B$ phase and a soft magnetic phase, wherein the volume percentage of the hard magnetic phase is 60 vol. % or more, and the soft magnetic phase is distributed on the grain boundaries of the hard magnetic phase; and exhibits hard magnetic properties including a remanence $B_r$ of at least about 0.7 T and a coercivity $H_{cJ}$ of at least about 480 kA/m.

2. The nanocomposite magnet of claim 1, wherein the hard magnetic phase has an average grain size of about 5 nm to about 200 nm; and the soft magnetic phase has an average grain size of about 1 nm to about 50 nm.

3. The nanocomposite magnet of claim 1, wherein the nanocomposite magnet has an oxygen content of at most about 700 ppm by mass.

4. The nanocomposite magnet of claim 1, wherein the nanocomposite magnet exhibits hard magnetic properties including a remanence $B_r$ of at least about 0.8 T and a coercivity $H_{cJ}$ of at least about 550 kA/m.

* * * * *